US012657149B2

(12) United States Patent     (10) Patent No.:   US 12,657,149 B2
Pan et al.            (45) Date of Patent:     Jun. 16, 2026

(54) COMPUTING SYSTEM, ADDRESSING METHOD, COMPUTE NODE, STORAGE MEDIUM, AND PROGRAM PRODUCT

(71) Applicant: HUAWEI TECHNOLOGIES CO., LTD., Shenzhen (CN)

(72) Inventors: Wei Pan, Shenzhen (CN); Tao Li, Shenzhen (CN); Junping Luo, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 124 days.

(21) Appl. No.: 18/641,106

(22) Filed: Apr. 19, 2024

(65) Prior Publication Data

US 2024/0273049 A1     Aug. 15, 2024

Related U.S. Application Data

(63) Continuation of application No. PCT/CN2022/109198, filed on Jul. 29, 2022.

(30) Foreign Application Priority Data

Oct. 21, 2021   (CN) .......................... 202111229581.2
Nov. 19, 2021   (CN) .......................... 202111402602.6

(51) Int. Cl.
   *G06F 12/1072*     (2016.01)
   *G06F 12/0802*     (2016.01)
   *G06F 13/40*       (2006.01)
(52) U.S. Cl.
   CPC ................................ *G06F 13/4068* (2013.01)

(58) Field of Classification Search
None
See application file for complete search history.

(56) References Cited

U.S. PATENT DOCUMENTS 7,149,815 B1 * 12/2006 Furukawa ........... H04L 61/2535
                                        709/245
9,460,039 B2 * 10/2016 Davis ..................... G06F 13/16
(Continued)

FOREIGN PATENT DOCUMENTS

CN     106688208 A     5/2017
CN     106951390 A     7/2017

*Primary Examiner* — Hyun Nam
(74) *Attorney, Agent, or Firm* — Leydig, Voit & Mayer, Ltd.

(57) ABSTRACT

Embodiments of this application disclose a computing system, an addressing method, a compute node, and a program product, and pertain to the computing field. Each compute node in a computing system has a different first-level identifier, and a plurality of function modules in each compute node have different second-level identifiers. The second-level identifier is used for routing and addressing between function modules in a same compute node, and the first-level identifier and the second-level identifier are used for routing and addressing between function modules in different compute nodes. In other words, unified addressing is performed on the different compute nodes, and is also performed on the function modules in the same compute node. In this way, interconnection specifications used during communication between the compute nodes and communication in the compute node are consistent, complex protocol conversion is not needed, data processing efficiency is improved, and latency is reduced.

18 Claims, 8 Drawing Sheets

(56) References Cited

U.S. PATENT DOCUMENTS

| | | | |
|---|---|---|---|
| 10,606,779 B2 * | 3/2020 | Custodio | G06F 15/7867 |
| 2002/0046251 A1 * | 4/2002 | Siegel | G06T 1/0007 |
| | | | 709/213 |
| 2003/0118034 A1 * | 6/2003 | Furukawa | H04L 61/2591 |
| | | | 370/352 |
| 2008/0031158 A1 | 2/2008 | Lu | |
| 2016/0224270 A1 * | 8/2016 | Palmer | G06F 13/102 |
| 2017/0185543 A1 * | 6/2017 | Nieuwejaar | G06F 13/4282 |
| 2018/0089098 A1 * | 3/2018 | Guim Bernat | G06F 12/1441 |
| 2018/0293624 A1 * | 10/2018 | Nelakonda | G06Q 30/0277 |
| 2018/0300762 A1 * | 10/2018 | Nelakonda | H04L 67/02 |
| 2019/0065419 A1 * | 2/2019 | Steinmacher-Burow | |
| | | | G06F 13/1673 |
| 2020/0371955 A1 * | 11/2020 | Goodacre | G06F 12/0811 |
| 2023/0195514 A1 * | 6/2023 | Vacchi | G06F 9/4881 |
| | | | 718/102 |
| 2024/0273049 A1 * | 8/2024 | Pan | H04L 45/74 |

* cited by examiner

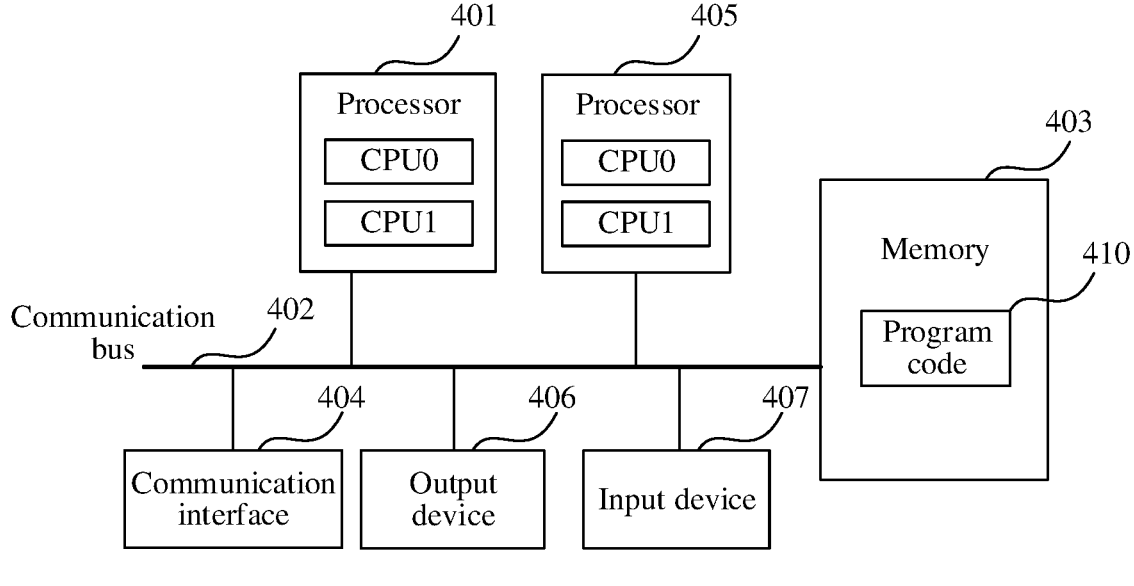

FIG. 4

A first function module in a first compute node sends a first request to a second function module in a second compute node, to request to access a resource of the second function module, where each compute node has a different first-level identifier, a plurality of function modules in each compute node have different second-level identifiers, the second-level identifier is used for routing and addressing between function modules in a same compute node, and the first-level identifier and the second-level identifier are used for routing and addressing between function modules in different compute nodes    501

The first function module receives a first response returned by the second function module    502

FIG. 5

COMPUTING SYSTEM, ADDRESSING METHOD, COMPUTE NODE, STORAGE MEDIUM, AND PROGRAM PRODUCT

CROSS-REFERENCE TO RELATED APPLICATIONS

This application is a continuation of International Application No. PCT/CN2022/109198, filed on Jul. 29, 2022, which claims priority to Chinese Patent Application No. 202111229581.2, filed on Oct. 21, 2021 and Chinese Patent Application No. 202111402602.6, filed on Nov. 19, 2021. All of the aforementioned patent applications are hereby incorporated by reference in their entireties.

TECHNICAL FIELD

Embodiments of this application relate to the computing field, and in particular, to a computing system, an addressing method, a compute node, a storage medium, and a program product.

BACKGROUND

With the increase in computing requirements and the promotion of cloud services, the industry has increasingly more requirements for data centers. A data center includes a plurality of compute nodes, and the compute nodes need to communicate with each other to improve performance of the data center. Communication between the compute nodes needs to depend on addressing.

The communication between the compute nodes involves interconnection between objects at a plurality of layers, including interconnection between the compute nodes, between modules in the compute node, and between components in the module. The compute node is, for example, a server, the module is, for example, a processor in the server or a peripheral connected to the processor, and the component in the module is, for example, a component inside the processor. Currently, objects at different layers are interconnected based on many protocols, and many types of identifiers (IDs) are used for addressing. For example, a host address (HA) line inside a central processing unit CPU) and a memory (MEM) in a peripheral are interconnected by using the Joint Electron Device Engineering Council (JEDEC) protocol, cache coherent (CC) buses between different CPUs are interconnected by using an ultra path interconnect (UPI) or coherent hub interface (CHI) protocol, an industrial input/output (IIO) interface inside the CPU is interconnected with a switch and a network interface card in the peripheral by using the peripheral component interconnect-express (PCIe) protocol, and a network interface card in a compute node and a switch in the Internet are interconnected by using the Ethernet protocol or the infiniband (IB) protocol. In addition, a mesh ID is allocated to each component inside the CPU, a node ID is allocated to the CPU, a bus-device-function (BDF) forms an ID corresponding to the peripheral (for example, a PCIe device) connected to the CPU, and an Internet protocol (IP) address is allocated to the compute node as a unique ID of the compute node in the Internet. Protocol conversion is needed when the compute nodes communicate with each other based on different protocols and different types of IDs.

However, a service in the data center requires low-latency performance. Currently, the objects at the different layers in the data center are divided by various protocols, and complex protocol conversion causes long latency in a data processing procedure. In addition, diversity of the protocols also leads to difficult communication bus design and a heavy software stack.

SUMMARY

Embodiments of this application provide a computing system, an addressing method, a compute node, a storage medium, and a program product, to reduce complex protocol conversion, improve data processing efficiency, simplify bus design, and reduce heaviness of a software stack. Technical solutions are as follows:

According to a first aspect, a computing system is provided. The computing system includes a plurality of compute nodes, each compute node has a different first-level identifier, and a plurality of function modules in each compute node have different second-level identifiers. The second-level identifier is used for routing and addressing between function modules in a same compute node, and the first-level identifier and the second-level identifier are used for routing and addressing between function modules in different compute nodes.

In other words, in this solution, unified addressing is performed on different compute nodes, and is also performed on function modules in a same compute node. In this way, interconnection specifications used during communication between compute nodes are consistent, complex protocol conversion is not needed, data processing efficiency is improved, and latency is reduced. In addition, the unified addressing enables bus design to be simple and reduces heaviness of the software stack. To some extent, this enables all resources in the computing system to be visible, and inter-node access does not need software stack support.

In this embodiment of this application, a same addressing rule is used for a mode of routing and addressing between the function modules in the same compute node and for a mode of routing and addressing between the function modules in the different compute nodes. A same communication protocol is used for the routing and addressing between the function modules in the same compute node and for the routing and addressing between the function modules in the different compute nodes.

Optionally, one or more layers of intermediate domains are further included between a first-level domain corresponding to the compute node and a second-level domain corresponding to the function module, function modules in different intermediate domains at a same layer have different intermediate domain identifiers, and the intermediate domain identifier is used for routing and addressing between function modules in different intermediate domains. It should be noted that one intermediate domain includes one or more function modules, and function modules in a same intermediate domain may form one logical module, and the logical module has one intermediate domain identifier. The intermediate domain identifier is an intermediate domain identifier of each function module in the logical module. In short, different intermediate domains correspond to different intermediate domain identifiers, and an intermediate domain identifier of the function module is an intermediate domain identifier corresponding to an intermediate domain to which the function module belongs. In other words, the unified addressing is also performed on logical modules in a same compute node, so that interconnection specifications used during communication between the logical modules are consistent, protocol conversion is reduced, and data processing efficiency is improved.

It should be noted that, if no intermediate domain exists between a first-level domain and a second-level domain, second-level identifiers of function modules in a same compute node are different. If an intermediate domain exists between the first-level domain and the second-level domain, second-level identifiers of function modules in different intermediate domains are the same or different.

Optionally, the computing system includes one or more layers of advanced domains, compute nodes in different advanced domains at a same layer have different advanced domain identifiers, and the advanced domain identifier is used for routing and addressing between compute nodes in different advanced domains. It should be noted that a higher-level domain, that is, an advanced domain, may be further divided above the first-level domain. One advanced domain includes one or more compute nodes, and different advanced domains correspond to different intermediate domain identifiers. An advanced domain identifier of the compute node is an advanced domain identifier corresponding to an advanced domain to which the compute node belongs. The unified addressing is performed on the compute nodes in different advanced domains at a same layer, so that interconnection specifications used during communication between compute nodes in different advanced domains are consistent, the protocol conversion is reduced, and the data processing efficiency is improved.

It should be noted that, if no advanced domain exists above the first-level domain, first-level identifiers of compute nodes in the computing system are different. If an advanced domain further exists above the first-level domain, first-level identifiers of compute nodes in different advanced domains are the same or different.

Optionally, the function module includes a function engine and a port. The function engine has a resource and a routing capability, and the port has independent configuration space and is configured to forward a message of the function engine. In other words, the function module is divided into a function engine and a port. On a data plane, the function engine can initiate communication, and the port is configured to assist in communication between function engines. In this way, the function engine is decoupled from the port. This facilitates management.

Optionally, if an intermediate domain further exists between the first-level domain and the second-level domain, ports are classified into two types. One type of port is configured to connect different compute nodes, and the other type of port is configured to connect function modules in different intermediate domains in a same compute node. Alternatively, if an intermediate domain further exists between the first-level domain and the second-level domain, and an advanced domain further exists above the first-level domain, ports are classified into three types. One type of port is configured to connect different compute nodes, another type of port is configured to connect function modules in different intermediate domains in a same compute node, and still another type of port is configured to connect compute nodes in different advanced domains. Alternatively, if an intermediate domain further exists between the first-level domain and the second-level domain, and an advanced domain further exists above the first-level domain, ports are classified into two types. One type of port is configured to connect compute nodes in different advanced domains, and the other type of port is configured to connect function modules in different intermediate domains in a same compute node. In other words, ports for interconnection are classified, to facilitate management.

Optionally, the resource includes at least one of a computing resource, a storage resource, and a network resource.

According to a second aspect, an addressing method is provided, and the method is applied to a computing system. The computing system includes a plurality of compute nodes, each compute node has a different first-level identifier, and a plurality of function modules in each compute node have different second-level identifiers. The method includes: A first function module in a first compute node sends a first request to a second function module in a second compute node, to request to access a resource of the second function module. The first function module receives a first response returned by the second function module. The first request carries a first source address, a first destination address, and an address of the resource that the first function module requests to access. The first source address includes a first-level identifier of the first compute node and a second-level identifier of the first function module, and the first destination address includes a first-level identifier of the second compute node and a second-level identifier of the second function module.

In other words, in this solution, unified addressing is performed on different compute nodes, and is also performed on function modules in a same compute node. In this way, interconnection specifications used during communication between compute nodes are consistent, complex protocol conversion is not needed, data processing efficiency is improved, and latency is reduced. In addition, the unified addressing enables bus design to be simple and reduces heaviness of the software stack.

In this embodiment of this application, a same addressing rule is used for a mode of routing and addressing between function modules in a same compute node and for a mode of routing and addressing between function modules in different compute nodes. A same communication protocol is used for routing and addressing between function modules in a same compute node and for routing and addressing between function modules in different compute nodes.

Optionally, one or more layers of intermediate domains are further included between a first-level domain corresponding to the compute node and a second-level domain corresponding to the function module, and function modules in different intermediate domains at a same layer have different intermediate domain identifiers. The first source address further includes an intermediate domain identifier of the first function module, and the first destination address further includes an intermediate domain identifier of the second function module. It should be noted that the intermediate domain identifier is used for routing and addressing between function modules in different intermediate domains, one intermediate domain includes one or more function modules, function modules in a same intermediate domain may form one logical module, and the logical module has one intermediate domain identifier. The intermediate domain identifier is an intermediate domain identifier of each function module in the logical module. In short, different intermediate domains correspond to different intermediate domain identifiers, and an intermediate domain identifier of the function module is an intermediate domain identifier corresponding to an intermediate domain to which the function module belongs. In other words, the unified addressing is also performed on logical modules in a same compute node, so that interconnection specifications used during communication between the logical modules are consistent, the protocol conversion is reduced, and the data processing efficiency is improved.

It should be noted that, if no intermediate domain exists between a first-level domain and a second-level domain, second-level identifiers of function modules in a same compute node are different. If an intermediate domain exists between the first-level domain and the second-level domain, second-level identifiers of function modules in different intermediate domains are the same or different.

Optionally, the computing system includes one or more layers of advanced domains, and compute nodes in different advanced domains at a same layer have different advanced domain identifiers. If the first compute node and the second compute node belong to different advanced domains, the first source address further includes an advanced domain identifier of the first compute node, and the first destination address further includes an advanced domain identifier of the second compute node. It should be noted that a higher-level domain, that is, an advanced domain, may be further divided above the first-level domain. One advanced domain includes one or more compute nodes, and different advanced domains correspond to different intermediate domain identifiers. An advanced domain identifier of the compute node is an advanced domain identifier corresponding to an advanced domain to which the compute node belongs. The unified addressing is performed on the compute nodes in different advanced domains at a same layer, so that interconnection specifications used during communication between compute nodes in different advanced domains are consistent, the protocol conversion is reduced, and the data processing efficiency is improved.

Optionally, the function module includes a function engine and a port. The function engine has a resource and a routing capability, and the port has independent configuration space and is configured to forward a message of the function engine. The first function module is a first function engine, and the second function module is a second function engine. That a first function module in a first compute node sends a first request to a second function module in a second compute node, to request to access a resource of the second function module includes: The first function engine sends the first request to the second function engine through a port corresponding to the first function engine, to request to access the resource of the second function engine. In other words, the function module is divided into a function engine and a port. The function engine can initiate data plane communication, and the port is configured to assist in the data plane communication. In this way, the function engine is decoupled from the port. This facilitates management.

Optionally, the method further includes: For a third function module and a fourth function module in the first compute node, the third function module sends a second request to the fourth function module, to request to access a resource of the fourth function module. The third function module receives a second response returned by the fourth function module. The second request carries a second source address, a second destination address, and an address of a resource that the third function module requests to access. The second source address includes a second-level identifier of the third function module, and the second destination address includes a second-level identifier of the fourth function module. In other words, communication between function modules in the compute node also complies with a unified interconnection specification, to reduce the protocol conversion and improve the data processing efficiency.

Optionally, one or more layers of intermediate domains are further included between the first-level domain corresponding to the compute node and the second-level domain corresponding to the function module, and the function modules in the different intermediate domains at the same layer have different intermediate domain identifiers. If the third function module and the fourth function module belong to different intermediate domains, the second source address further includes an intermediate domain identifier of the third function module, and the second destination address further includes an intermediate domain identifier of the fourth function module.

In other words, the function module includes a function engine and a port. The function engine has a resource and a routing capability, and the port has independent configuration space and is configured to forward a message of the function engine. The third function module is a third function engine, and the fourth function module is a fourth function engine. That the third function module sends a second request to the fourth function module, to request to access a resource of the fourth function module includes: If the third function engine and the fourth function engine belong to different intermediate domains, the third function engine sends the second request to the fourth function engine through a port corresponding to the third function engine, to request to access the resource of the fourth function engine. In other words, the function engine is decoupled from the port. This facilitates management.

Optionally, if an intermediate domain further exists between the first-level domain and the second-level domain, ports are classified into two types. One type of port is configured to connect different compute nodes, and the other type of port is configured to connect function modules in different intermediate domains in a same compute node. Alternatively, if an intermediate domain further exists between the first-level domain and the second-level domain, and an advanced domain further exists above the first-level domain, ports are classified into three types. One type of port is configured to connect different compute nodes, another type of port is configured to connect function modules in different intermediate domains in a same compute node, and still another type of port is configured to connect compute nodes in different advanced domains. Alternatively, if an intermediate domain further exists between the first-level domain and the second-level domain, and an advanced domain further exists above the first-level domain, ports are classified into two types. One type of port is configured to connect compute nodes in different advanced domains, and the other type of port is configured to connect function modules in different intermediate domains in a same compute node. In other words, ports for interconnection are classified, to facilitate management.

Optionally, the resource includes at least one of a computing resource, a storage resource, and a network resource.

According to a third aspect, an addressing apparatus is provided. The addressing apparatus has a function of implementing behavior of the addressing method in the second aspect. The addressing apparatus includes one or more modules, and the one or more modules are configured to implement the addressing method provided in the second aspect. The addressing apparatus is a compute node.

In other words, a first compute node is provided. The first compute node is a compute node in a computing system. The computing system includes a plurality of compute nodes, each compute node has a different first-level identifier, and a plurality of function modules in each compute node have different second-level identifiers.

A first function module in the first compute node is configured to send a first request to a second function module in a second compute node, to request to access a resource of the second function module.

7

8

The first function module is further configured to receive a first response returned by the second function module.

The first request carries a first source address, a first destination address, and an address of the resource that the first function module requests to access. The first source address includes a first-level identifier of the first compute node and a second-level identifier of the first function module, and the first destination address includes a first-level identifier of the second compute node and a second-level identifier of the second function module.

Optionally, one or more layers of intermediate domains are further included between a first-level domain corresponding to the compute node and a second-level domain corresponding to the function module, and function modules in different intermediate domains at a same layer have different intermediate domain identifiers. The first source address further includes an intermediate domain identifier of the first function module, and the first destination address further includes an intermediate domain identifier of the second function module.

Optionally, the computing system includes one or more layers of advanced domains, and compute nodes in different advanced domains at a same layer have different advanced domain identifiers. If the first compute node and the second compute node belong to different advanced domains, the first source address further includes an advanced domain identifier of the first compute node, and the first destination address further includes an advanced domain identifier of the second compute node.

Optionally, the function module includes a function engine and a port. The function engine has a resource and a routing capability, and the port has independent configuration space and is configured to forward a message of the function engine. The first function module is a first function engine, and the second function module is a second function engine.

The first function engine is configured to send the first request to the second function engine through a port corresponding to the first function engine, to request to access a resource of the second function engine.

Optionally, for a third function module and a fourth function module in the first compute node, the third function module is configured to send a second request to the fourth function module, to request to access a resource of the fourth function module.

The third function module is further configured to receive a second response returned by the fourth function module.

The second request carries a second source address, a second destination address, and an address of a resource that the third function module requests to access. The second source address includes a second-level identifier of the third function module, and the second destination address includes a second-level identifier of the fourth function module.

Optionally, one or more layers of intermediate domains are further included between the first-level domain corresponding to the compute node and the second-level domain corresponding to the function module, and the function modules in the different intermediate domains at the same layer have different intermediate domain identifiers. If the third function module and the fourth function module belong to different intermediate domains, the second source address further includes an intermediate domain identifier of the third function module, and the second destination address further includes an intermediate domain identifier of the fourth function module.

Optionally, the function module includes a function engine and a port. The function engine has a resource and a routing capability, and the port has independent configuration space and is configured to forward a message of the function engine. The third function module is a third function engine, and the fourth function module is a fourth function engine.

The third function engine is configured to: if the third function engine and the fourth function engine belong to different intermediate domains, send the second request to the fourth function engine through a port corresponding to the third function engine, to request to access a resource of the fourth function engine.

Optionally, the resource includes at least one of a computing resource, a storage resource, and a network resource.

According to a fourth aspect, a computer device is provided. The computer device includes a processor and a memory: The memory is configured to store a program for performing the addressing method provided in the second aspect, and store data used to implement the addressing method provided in the second aspect. The processor is configured to execute the program stored in the memory. An operation apparatus of the storage device may further include a communication bus, and the communication bus is configured to establish a connection between the processor and the memory.

According to a fifth aspect, a computer-readable storage medium is provided. The computer-readable storage medium stores instructions, and when the instructions are run on a computer, the computer is enabled to perform the addressing method in the second aspect.

According to a sixth aspect, a computer program product including instructions is provided. When the computer program product is run on a computer, the computer is enabled to perform the addressing method in the second aspect.

Technical effects achieved by the third aspect, the fourth aspect, the fifth aspect, and the sixth aspect are similar to those achieved by corresponding technical means in the first aspect or the second aspect. Details are not described herein again.

The technical solutions provided in embodiments of this application can achieve at least the following beneficial effects.

In this embodiment of this application, each compute node in the computing system has a different first-level identifier, and a plurality of function modules in each compute node have different second-level identifiers. The second-level identifier is used for routing and addressing between function modules in a same compute node, and the first-level identifier and the second-level identifier are used for routing and addressing between function modules in different compute nodes. In other words, unified addressing is performed on different compute nodes, and is also performed on function modules in a same compute node. In this way, interconnection specifications used during communication between compute nodes and communication in compute nodes are consistent, complex protocol conversion is not needed, data processing efficiency is improved, and latency is reduced. In addition, the unified addressing enables bus design to be simple and reduces heaviness of the software stack.

BRIEF DESCRIPTION OF DRAWINGS

FIG. 4 is a schematic diagram of a structure of a computer device according to an embodiment of this application:

FIG. 5 is a flowchart of an addressing method according to an embodiment of this application:

DESCRIPTION OF EMBODIMENTS

To make objectives, technical solutions, and advantages of embodiments of this application clearer, the following further describes implementations of this application in detail with reference to the accompanying drawings.

First, it should be noted that a network architecture and a service scenario described in embodiments of this application are intended to describe the technical solutions in embodiments of this application more clearly, and do not constitute a limitation on the technical solutions provided in embodiments of this application. A person of ordinary skill in the art may know that: With the evolution of the network architecture and the emergence of new service scenarios, the technical solutions provided in embodiments of this application are also applicable to similar technical problems.

Figure 1:
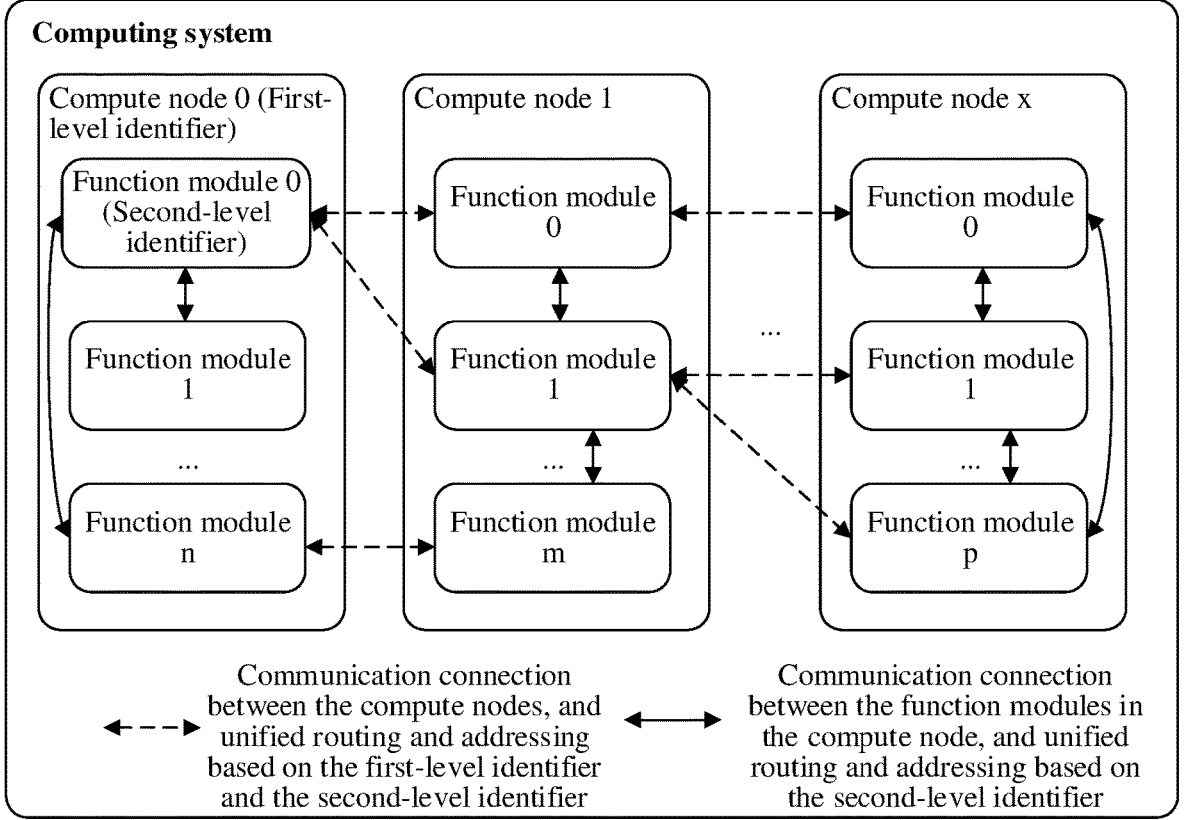
FIG. 1 is a diagram of a system architecture in an addressing method according to an embodiment of this application.

FIG. 1 is a diagram of a system architecture in an addressing method according to an embodiment of this application. The system may be referred to as a computing system, a multi-machine interconnection system, a multi-compute node interconnection system, a computer cluster, a computing center, a data center, or the like. Refer to FIG. 1. The system architecture includes a plurality of compute nodes, for example, a compute node 0 to a compute node x. Each compute node has a different first-level identifier, and a plurality of function modules in each compute node have different second-level identifiers. In other words, in the system, unified addressing is performed on different compute nodes, and is also performed on different function modules in a same compute node.

The second-level identifier is used for routing and addressing between function modules in a same compute node, and the first-level identifier and the second-level identifier are used for routing and addressing between function modules in different compute nodes. For example, when the function modules in the different compute nodes communicate with each other, routing and addressing may be directly performed based on the first-level identifier and the second-level identifier. When the function modules in the same compute node communicate with each other, the routing and addressing may be directly performed based on the second-level identifier. A complex and diversified interconnection protocol is not needed, in other words, complex protocol conversion is not needed. Optionally, different compute nodes belong to different first-level domains, and a first-level domain corresponds to a first-level identifier. Different function modules belong to different second-level domains, and a second-level domain corresponds to a second-level identifier.

In this embodiment of this application, a same addressing rule is used for a mode of routing and addressing between function modules in a same compute node and for a mode of routing and addressing between function modules in different compute nodes. A same communication protocol is used for routing and addressing between function modules in a same compute node and for routing and addressing between function modules in different compute nodes.

Optionally, one compute node is one server or one computer device in another form, one function module is one component in the compute node, and the component is a basic configurable unit in the compute node. For example, the component is a cost-based optimizer (CBO) and a HA in a CPU, for another example, the component is a PCIe engine in a PCIe device. An example in which a compute node is a server is used. One computing system includes a plurality of servers, and one server includes a plurality of components. Optionally, one operating system (OS) is run on one compute node, to manage all software and hardware resources of the compute node, and the like. The resource of the compute node includes one or more resources of a computing resource, a storage resource, a network resource, and the like. Compute nodes may access resources mutually, to improve performance of the computing system. Optionally, the storage resource includes a memory resource, configuration space, a register resource, and the like.

Optionally, the computing system includes one or more layers of advanced domains, compute nodes in different advanced domains at a same layer have different advanced domain identifiers, and the advanced domain identifier is used for routing and addressing between compute nodes in different advanced domains. In other words, a higher-level domain, that is, an advanced domain, may be further divided on a first-level domain corresponding to the compute node. An example in which the computing system includes one layer of advanced domains is used. One advanced domain includes one or more compute nodes, compute nodes in different advanced domains have different advanced domain identifiers, and compute nodes in a same advanced domain have a same advanced domain identifier.

Figure 2:
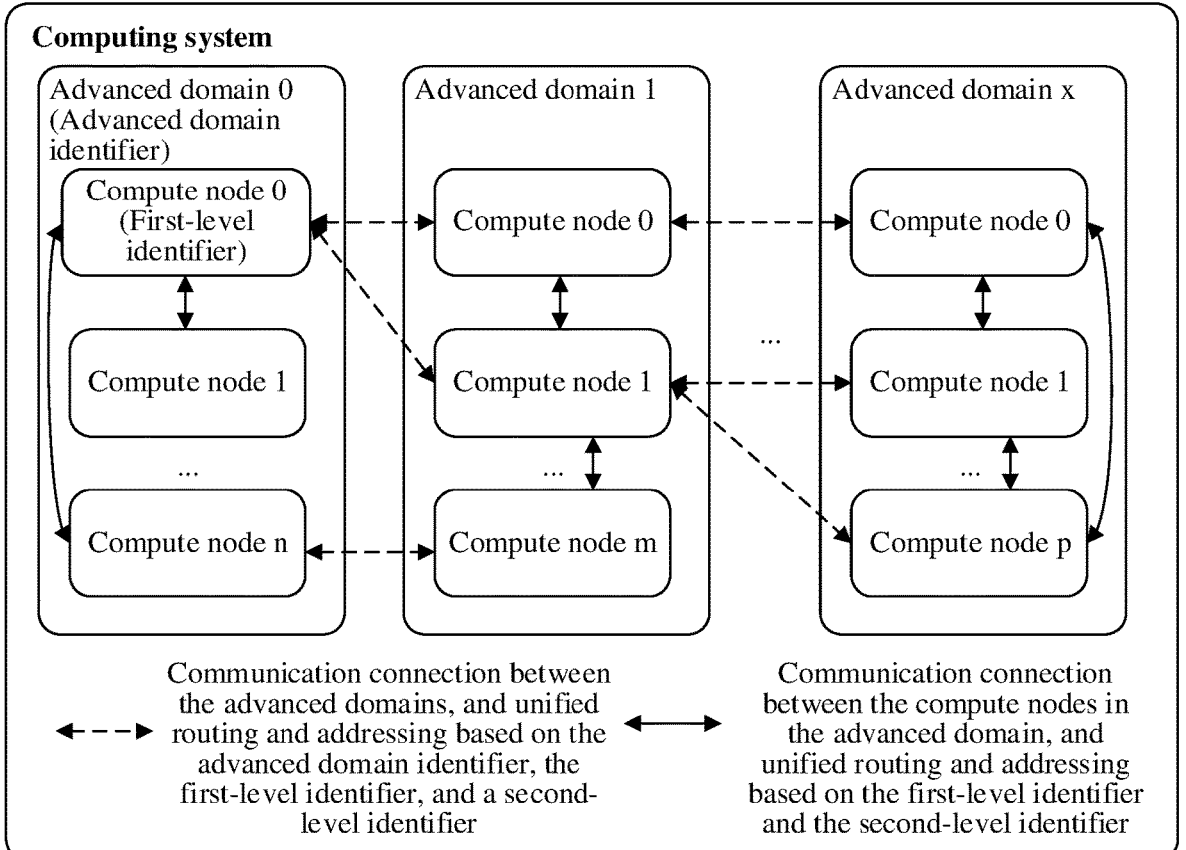
FIG. 2 is a diagram of a system architecture in another addressing method according to an embodiment of this application.

Optionally, if the computing system includes one layer of advanced domains, ports for interconnection in compute nodes are classified into two types. One type of port is configured to connect compute nodes in different advanced domains, and the other type of port is configured to connect different compute nodes in a same advanced domain. In a computing system shown in FIG. 2, the computing system includes an advanced domain 0 to an advanced domain x. Each advanced domain includes one or more compute nodes. For example, the advanced domain 0 includes a compute node 0 to a compute node n, an advanced domain 1 includes a compute node 0 to a compute node m, and the advanced domain x includes a compute node 0 to a compute node p. Dotted arrows in FIG. 2 indicate communication connections that are between advanced domains and that are established through a type of port, and unified routing and addressing is performed between different advanced domains based on an advanced domain identifier, a first-level identifier, and a second-level identifier. Solid arrows in FIG. 2 indicate communication connections that are between compute nodes in a same advanced domain and that are established through the other type of port, and the unified routing and addressing is performed between different compute nodes in the same advanced domain based on a first-level identifier and a second-level identifier. It should be noted that each compute node in FIG. 2 includes a plurality of function modules (not shown).

Optionally, one or more layers of intermediate domains are further included between the first-level domain corresponding to the compute node and a second-level domain corresponding to the function module, function modules in different intermediate domains at a same layer have different intermediate domain identifiers, and the intermediate domain identifier is used for routing and addressing between function modules in different intermediate domains. In other words, an intermediate domain may be further divided under the compute node and above the function module. An example in which one layer of intermediate domains is further included between the first-level domain and the second-level domain is used. One intermediate domain includes one or more function modules, function modules in different intermediate domains in a same compute node have different intermediate domain identifiers, and function modules in a same intermediate domain have a same intermediate domain identifier.

It should be noted that the function modules in the same intermediate domain may form one logical module, and the logical module has one intermediate domain identifier. The intermediate domain identifier is an intermediate domain identifier of each function module in the logical module. In short, different intermediate domains correspond to different intermediate domain identifiers, and an intermediate domain identifier of the function module is an intermediate domain identifier corresponding to an intermediate domain to which the function module belongs. In other words, the unified addressing is also performed on logical modules in a same compute node, so that interconnection specifications used during communication between the logical modules are consistent, protocol conversion is reduced, and data processing efficiency is improved.

In other words, an example in which one layer of intermediate domains is further included between the first-level domain and the second-level domain is used. Each compute node includes at least one logical module, and different logical modules in a same compute node have different intermediate domain identifiers. The logical module has a resource and a routing capability, and the intermediate domain identifier is used for routing and addressing between the different logical modules in the same compute node. The logical module is a physical module or a virtual module, and the physical module is a chip such as a CPU, a GPU, a network interface card, a graphics card, or a switch, or the physical module is a PCIe device. For example, one compute node includes two CPUs or four CPUs, and further includes a PCIe device. Both the CPU and the PCIe device in the compute node have different intermediate domain identifiers. When function modules in different CPUs communicate with each other, routing and addressing may be performed based on an intermediate domain identifier and a second-level identifier. When the CPU communicates with a function module in the PCIe device, the routing and addressing may also be performed based on the intermediate domain identifier and the second-level identifier. In this way, complex protocol conversion is not needed. Optionally, a resource of the logical module also includes one or more of a computing resource, a storage resource, or a network resource. For example, a CPU has a computing resource and a storage resource.

It should be noted that, if no intermediate domain exists between the first-level domain and the second-level domain, second-level identifiers of function modules in a same compute node are different. If an intermediate domain exists between the first-level domain and the second-level domain, second-level identifiers of function modules in different intermediate domains are the same or different.

To further improve overall performance of the computing system, a function module is further subdivided into a function engine and a port. For example, one logical module is decoupled into a logical module including at least one function engine and at least one port. Unified addressing is performed on function engine, and optionally, the unified addressing is also performed on the port. In other words, the function module includes a function engine and a port. The function engine has a resource and a routing capability, and the port has independent configuration space and is configured to forward a message of the function engine. This facilitates management.

Optionally, if an intermediate domain further exists between the first-level domain and the second-level domain, ports are classified into two types. One type of port is configured to connect different compute nodes, and the other type of port is configured to connect function modules in different intermediate domains in a same compute node. Alternatively, if an intermediate domain further exists between the first-level domain and the second-level domain, and an advanced domain further exists above the first-level domain, ports are classified into three types. One type of port is configured to connect different compute nodes, another type of port is configured to connect function modules in different intermediate domains in a same compute node, and still another type of port is configured to connect compute nodes in different advanced domains. Alternatively, if an intermediate domain further exists between the first-level domain and the second-level domain, and an advanced domain further exists above the first-level domain, ports are classified into two types. One type of port is configured to connect compute nodes in different advanced domains, and the other type of port is configured to connect function modules in different intermediate domains in a same compute node. In other words, ports for interconnection are classified, to facilitate management.

It should be noted that, in this embodiment of this application, based on an idea of separating an engine from a port, a function engine and a port are decoupled into different components, and the port has independent configuration space. In other words, configuration registers of the function engine and the port are designed separately, so that both the port and the function engine can be managed. On a data plane, only a function engine may directly initiate a request, a command, or the like to perform communication, and a port is only configured to assist in data plane communication. In other words, a port is only configured to transmit the request, the command, or the like, to connect function engines in the computing system. However, on a management plane, a port can also initiate communication. For example, if a port is faulty, the port may send a fault notification to a corresponding function engine.

Optionally, the function engine is, for example, a CBO or a HA inside a CPU, or a PCIe engine (engine) inside a PCIe device. The port is, for example, a CC port or an IIO port inside a CPU, or a PCIe port of a PCIe device.

It can be learned from the foregoing descriptions that, in this embodiment of this application, by using a hierarchical idea, the computing system is divided into a first-level domain, a second-level domain, and can even continue to be divided into an advanced domain, an intermediate domain, and the like. Ports of different types are designed to connect domains at different layers. For example, in some embodiments, a larger domain may further be extended above the first-level domain, and a port for inter-domain interconnection may be designed. For example, two layers of advanced domains exist above the first-level domain. A first-layer advanced domain above the first-level domain is referred to as a global domain (GD), and different global domains correspond to different global identifiers (global IDs, GIDs). A port that connects the different global domains is referred to as a global port (G-P). A second-layer advanced domain above the first-level domain may be referred to as a super global domain (super GD, SGD), and different super global domains correspond to different super global identifiers (super GIDs, SGIDs). A port configured to interconnect different super global domains may be referred to as a super global port (SG-P). The first-level domain may be referred to as a node domain (ND), and different node domains correspond to different node identifiers (node IDs, NIDs). A node identifier is a second-level identifier. The second-level domain may be referred to as a component domain (CD), and different component domains correspond to different component identifiers (component IDs, CIDs). A component identifier is a second-level identifier. In some embodiments, an intermediate domain may be further divided between the first-level domain and the second-level domain, and a port configured to interconnect the intermediate domains may be designed. For example, one layer of intermediate domains is included between the first-level domain and the second-level domain. The intermediate domain is referred to as a logical domain (LD) or a local domain (local domain), and different intermediate domains correspond to different intermediate domain identifiers. The intermediate domain identifier is referred to as a logical identifier (logical ID. LID) or local identifier (local ID), and a port that connects different intermediate domains is referred to as a logical port (L-P) or local port.

In this embodiment of this application, if one or more layers of advanced domains are further included above the first-level domain, compute nodes belonging to different advanced domains have different advanced domain identifiers. A compute node in the computing system is responsible for allocating an advanced domain identifier to a compute node in each advanced domain, or a dedicated management device or a control device is responsible for allocating an advanced domain identifier to a compute node in each advanced domain, or an advanced domain identifier is allocated in another manner, to ensure that the advanced domain identifiers do not conflict. For example, allocation of the advanced domain identifier depends on a management module at a corresponding layer. The management module may be an application program that is run in an OS of a compute node.

Different compute nodes have different first-level identifiers. A compute node in the computing system allocates a first-level identifier to a compute node in the computing system, or a dedicated management device or a control device is responsible for allocating a first-level identifier to a compute node in the computing system, or a first-level identifier is allocated in another manner, to ensure that the first-level identifiers do not conflict. For example, allocation of the first-level identifier depends on a first-level management module. The management module may be an application program that is run in an OS of a compute node.

Alternatively, if one or more layers of advanced domains are further included above the first-level domain, different compute nodes in a same advanced domain have different first-level identifiers. For compute nodes belonging to the same advanced domain, a compute node in the advanced domain allocates a first-level identifier to a compute node in the advanced domain, or a dedicated management device or a control device is responsible for allocating a first-level identifier to a compute node in the advanced domain, or a first-level identifier is allocated in another manner, to ensure that the first-level identifiers do not conflict. For example, allocation of the first-level identifier depends on a second-level management module. The management module may be an application program that is run in an OS of a compute node.

If one layer of intermediate domains is further included between the first-level domain and the second-level domain, it is assumed that one intermediate domain corresponds to one logical module, and different logical modules in a same compute node have different intermediate domain identifiers. For logical modules belonging to a same compute node, a logical module in the compute node allocates an intermediate domain identifier to another logical module in the compute node, or a dedicated management device or a control device is responsible for allocating an intermediate domain identifier to another logical module in the compute node, or an intermediate domain identifier is allocated in another manner, to ensure that the intermediate domain identifiers do not conflict. For example, a CPU that is responsible for starting and that is in the compute node allocates an intermediate domain identifier to another logical module in the compute node. The intermediate domain identifier of the CPU responsible for starting may be pre-allocated in a form of a strap pin. For example, after being started, the CPU responsible for starting performs routing by using a pre-allocated intermediate domain identifier, to discover another logical module in the compute node. After a basic input output system (BIOS) is discovered and the BIOS is started, the CPU responsible for starting allocates an intermediate domain identifier to another logical module by using an enumeration module of the BIOS.

Optionally, different logical modules in a same advanced domain have different third-level identifiers. For logical modules belonging to a same advanced domain, a logical module in the advanced domain allocates an intermediate domain identifier to another logical module in the advanced domain, or a dedicated management device or a control device is responsible for allocating an intermediate domain identifier to another logical module in the advanced domain, or an intermediate domain identifier is allocated in another manner, to ensure that the intermediate domain identifiers do not conflict. For example, a CPU that is responsible for starting and that is in a compute node in the advanced domain allocates an intermediate domain identifier to another logical module in the advanced domain. The intermediate domain identifier of the CPU responsible for starting may be pre-allocated in the form of a strap pin. For example, after being started, the CPU responsible for starting performs routing by using a pre-allocated intermediate domain identifier, to discover another logical module in the advanced domain. After the BIOS is discovered and the BIOS is started, the CPU responsible for starting gradually discovers another logical module in the advanced domain by using the BIOS, and allocates an advanced identifier to the discovered logical module.

Optionally, different function engines in a same logical module have different second-level identifiers, and different ports in a same logical module have different second-level identifiers. Second-level identifiers of a function engine and a port may be pre-configured identifiers, in other words, a second-level identifier may be pre-written. Optionally, any one of the first-level identifier, the second-level identifier, the intermediate domain identifier, and the advanced domain identifier may be pre-written.

Optionally, if different logical modules in a same advanced domain have different intermediate domain identifiers, an intermediate domain identifier and a second-level identifier may be used for routing and addressing between the different logical modules in the same advanced domain. In this way, a first-level identifier of a compute node may be omitted during unified addressing, and unified addressing of the same advanced domain is performed directly by using an intermediate domain identifier of a lower-level logic module.

Figure 3:
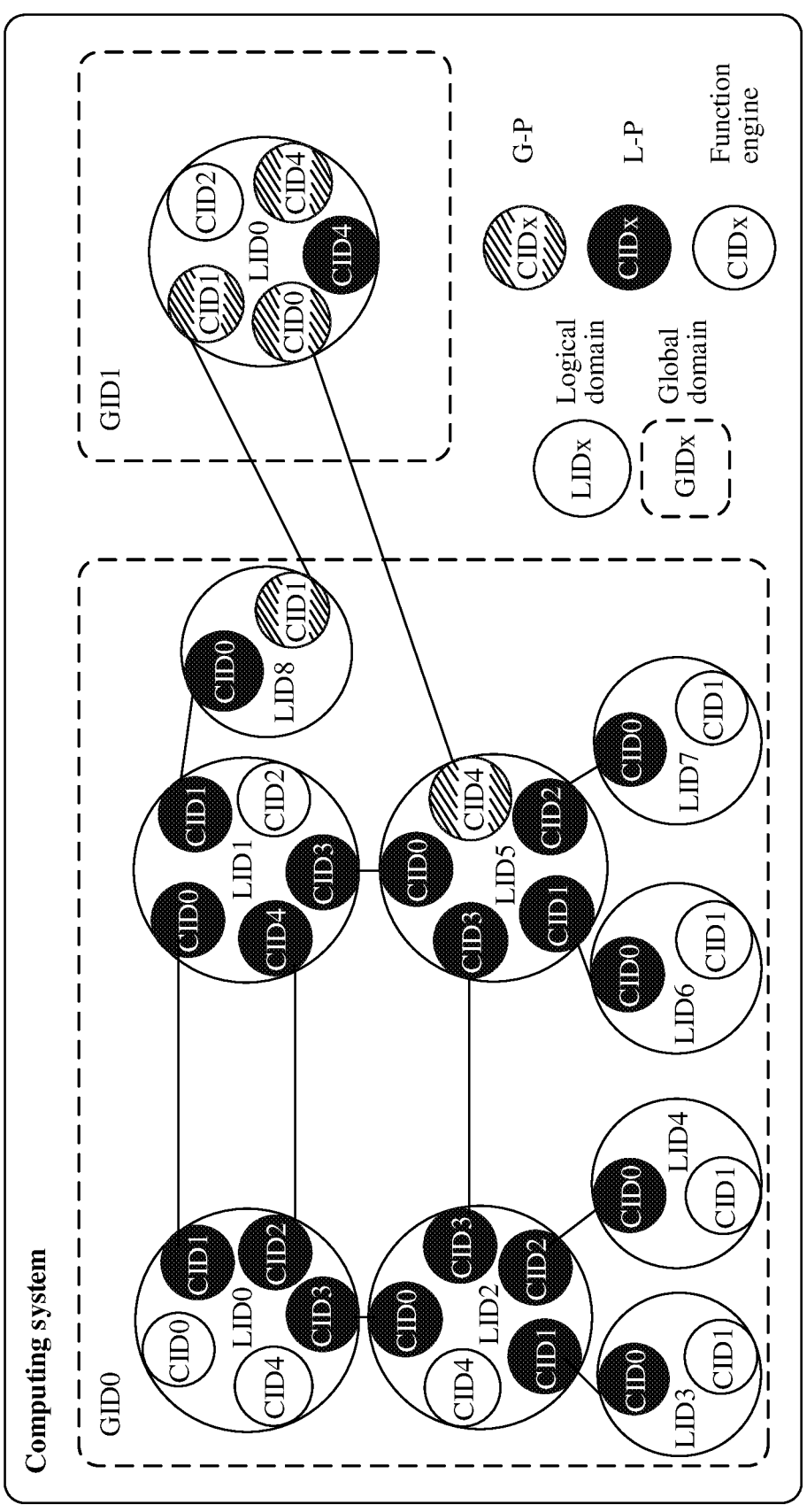
FIG. 3 is a diagram of a system architecture in still another addressing method according to an embodiment of this application.

FIG. 3 is a diagram of a system architecture in another addressing method according to an embodiment of this application. The system includes a plurality of global domains. In the figure, GD1 and GD2 are used as examples, and identifiers of the two global domains are respectively GID0 and GID1. In FIG. 3, different logical modules in a same global domain have different logical identifiers, in other words, unified addressing is performed on the different logical modules in the same global domain. There are a plurality of logical domains in GD0. Each logical domain includes one logical module, and the logical module is identified by an LID. There are a plurality of logical domains in GD1, and only one logical domain is shown in the figure. Each logical domain includes one logical module, and a third-level identifier of the logical module shown in the figure is LID0, Each logic module includes a function engine and a port, or some logic modules include only ports (for example, LID5 and LID8 in the figure). The Function engine and the port are identified by CIDs. Ports are classified into global ports (G-P) and local ports (L-P).

In this embodiment of this application, in compute nodes or between compute nodes, identifiers of the compute nodes need to be learned, to facilitate communication. Optionally, a dedicated management device or a control device stores a first-level identifier and an advanced domain identifier of each compute node in a computing system, and a second-level identifier and an intermediate domain identifier of each function module into each compute node in an out-of-band manner, for example, storing these identifiers by using a register, so that communication is performed in the compute nodes and between the compute nodes based on the identifiers. Alternatively, each compute node in the computing system exchanges the first-level identifier and the advanced domain identifier of the compute node in an in-band manner, and exchanges the second-level identifier and the intermediate domain identifier of each function module. For example, identifiers are notified to each other in a broadcast manner. For another example, a function module in another compute node is discovered through a bus, and respective identifiers are exchanged, so that communication is performed in the compute nodes and between the compute nodes based on the identifiers.

It should be noted that the foregoing identifier allocation manner and the identifier learning manner are merely described as examples, and are not intended to limit this embodiment of this application. In some other embodiments, an identifier may be allocated in another manner, or an identifier may be learned in another manner.

FIG. 4 is a schematic diagram of a structure of a computer device according to an embodiment of this application. Optionally: the computer device is any compute node shown in FIG. 1. The computer device includes one or more processors 401, a communication bus 402, a memory 403, and one or more communication interfaces 404.

The processor 401 is a general-purpose central processing unit (CPU), a network processor (NP), a microprocessor, or one or more integrated circuits configured to implement the solutions of this application, for example, an application-specific integrated circuit (ASIC), a programmable logic device (PLD), or a combination thereof. Optionally, the PLD is a complex programmable logic device (CPLD), a field-programmable gate array (FPGA), a generic array logic (GAL), or any combination thereof.

The communication bus 402 is configured to transmit information between the foregoing components. Optionally, the communication bus 402 is classified into an address bus, a data bus, a control bus, and the like. For ease of representation, only one thick line is used to represent the bus in the figure, but this does not mean that there is only one bus or only one type of bus.

Optionally: the memory 403 is a read-only memory (ROM), a random access memory (RAM), an electrically erasable programmable read-only memory (EEPROM), an optical disc (including a compact disc read-only memory (CD-ROM), a compact disc, a laser disc, a digital versatile disc, a Blu-ray disc, or the like), a magnetic disk storage medium, or other magnetic storage devices, or any other medium that can be used to carry or store desired program code in a form of instructions or a data structure and can be accessed by a computer, but is not limited thereto. The memory 403 exists independently, and is connected to the processor 401 through the communication bus 402, or the memory 403 is integrated with the processor 401.

The communication interface 404 is configured to communicate with another device or a communication network by using any apparatus such as a transceiver. The communication interface 404 includes a wired communication interface, and optionally further includes a wireless communication interface. The wired communication interface is, for example, an Ethernet interface. Optionally, the Ethernet interface is an optical interface, an electrical interface, or a combination thereof. The wireless communication interface is a wireless local area network (WLAN) interface, a cellular network communication interface, a combination thereof, or the like.

Optionally, in some embodiments, the computer device includes a plurality of processors, such as the processor 401 and a processor 405 shown in FIG. 4. Each of the processors is a single-core processor or a multi-core processor. Optionally, the processor herein is one or more devices, circuits, and/or processing cores for processing data (such as computer program instructions).

In a specific implementation, in an embodiment, the computer device further includes an output device 406 and an input device 407. The output device 406 communicates with the processor 401, and can display information in a plurality of manners. For example, the output device 406 is a liquid crystal display (LCD), a light emitting diode (LED) display device, a cathode ray tube (CRT) display device, a projector, or the like. The input device 407 communicates with the processor 401, and can receive an input of a user in a plurality of manners. For example, the input device 407 is a mouse, a keyboard, a touchscreen device, or a sensor device.

In some embodiments, the memory 403 is configured to store program code 410 for executing the solutions in this application, and the processor 401 can execute the program code 410 stored in the memory 403. The program code includes one or more software modules. The computer device can implement, by using the processor 401 and the program code 410 in the memory 403, an addressing method provided in the following embodiment in FIG. 5.

FIG. 5 is a flowchart of an addressing method according to an embodiment of this application. The method is applied to a computing system. Refer to FIG. 5. The method includes the following steps.

Step 501: A first function module in a first compute node sends a first request to a second function module in a second compute node, to request to access a resource of the second function module, where each compute node has a different first-level identifier, a plurality of function modules in each compute node have different second-level identifiers, the second-level identifier is used for routing and addressing between function modules in a same compute node, and the first-level identifier and the second-level identifier are used for routing and addressing between function modules in different compute nodes.

It can be learned from the foregoing descriptions that, to reduce complex protocol conversion in a communication process, in this embodiment of this application, unified addressing is performed on the compute nodes in the computing system, and is also performed on the function modules in the compute node. In other words, each compute node has the different first-level identifier, and the plurality of function modules in each compute node have the different second-level identifiers. The second-level identifier is used for the routing and addressing between the function modules in the same compute node, and the first-level identifier and the second-level identifier are used for the routing and addressing between the function modules in the different compute nodes. In other words, in this solution, the unified addressing is performed to unify interconnection specifications between the compute nodes, to further reduce protocol conversion. To some extent, this enables all resources in the computing system to be visible, and inter-node access does not need software stack support.

A same addressing rule is used for a mode of the routing and addressing between the function modules in the same compute node and for a mode of the routing and addressing between the function modules in the different compute nodes. A same communication protocol is used for the routing and addressing between the function modules in the same compute node and for the routing and addressing between the function modules in the different compute nodes.

The following describes the addressing method provided in this embodiment of this application by using communication between the first compute node and the second compute node as an example.

In this embodiment of this application, the first function module in the first compute node sends the first request to the second function module in the second compute node, to request to access the resource of the second function module. The first request carries a first source address, a first destination address, and an address of the resource that the first function module requests to access. The first source address includes a first-level identifier of the first compute node and a second-level identifier of the first function module, and the first destination address includes a first-level identifier of the second compute node and a second-level identifier of the second function module. In other words, the first compute node may directly initiate communication to the second compute node based on the first destination address, so that an intermediate agent does not need to forward a request between the first compute node and the second compute node through protocol conversion or the like.

Optionally, a resource of the compute node includes at least one of a computing resource, a storage resource, and a network resource. The storage resource includes a memory resource, configuration space, a register resource, and the like. A function module has a resource and a routing capability of a compute node.

Optionally, the first request includes a first field, a second field, and a third field. The first field is used to carry the first source address, the second field is used to carry the first destination address, and the third field is used to carry the address of the resource that the first function module requests to access. For example, the first request carries [(NID0, CID1), (NID0, CID0), ADDR0]. (NID0, CID1) represents the first source address. NID1 and CID0 are respectively the first-level identifier of the first compute node and the second-level identifier of the first function module. (NID0, CID0) represents the first destination address. NID0 and CID0 are respectively the first-level identifier of the second compute node and the second-level identifier of the second function module. ADDR0 is the address of the resource that the first function module requests to access. For example, the address of the resource is a cache line (cache line) address of memory space in a management range of a HA in the second compute node, in other words, ADDR0 is a memory address.

Optionally, the first request further carries domain indication information, and the domain indication information indicates communication between different compute nodes. For example, the domain indication information is [NID_valid=1, CID_valid=1] or [NID_valid=1].

Optionally, it can be learned from the foregoing descriptions that one or more layers of intermediate domains are further included between a first-level domain corresponding to the compute node and a second-level domain corresponding to the function module, and function modules in different intermediate domains at a same layer have different intermediate domain identifiers. In this case, the first source address further includes an intermediate domain identifier of the first function module, and the first destination address further includes an intermediate domain identifier of the second function module.

For example, one layer of intermediate domains is further included between the first-level domain and the second-level domain. It is assumed that one intermediate domain includes one logical module. A first function module of CPU0 in the first compute node initiates access to a register address ADDR1 managed by a second function module of a network interface card in the second compute node. The first request carries [(NID1, LID3, CID0), (NID0, LID0, CID0), ADDR1]. (NID1, LID3, CID0) represents the first source address, and NID1, LID3, and CID0 are respectively the first-level identifier of the first compute node, a logical identifier of CPU0, and a second-level identifier of the first function module. (NID0, LID0, CID0) represents the first destination address, and NID0, LID0, and CID0 are respectively the first-level identifier of the second compute node, a logical identifier of the network interface card, and a second-level identifier of the second function module. Optionally, the first request further carries domain indication information, and the domain indication information indicates communication between different compute nodes. For example, the domain indication information is [NID_valid=1, LID_valid=1] or [NID_valid=1]. The logical module has a resource and a routing capability, and the logical module is a physical module or a virtual module. This is not limited in this embodiment of this application.

Optionally, it can be learned from the foregoing descriptions that the computing system includes one or more layers of advanced domains, compute nodes in different advanced domains at a same layer have different advanced domain identifiers, and the advanced domain identifier is used for routing and addressing between the compute nodes in the different advanced domains. If the first compute node and the second compute node belong to different advanced domains, the first source address further includes an advanced domain identifier of the first compute node, and the first destination address further includes an advanced domain identifier of the second compute node.

For example, the computing system includes one layer of advanced domains. The first compute node and the second compute node belong to the different advanced domains. The foregoing example is still used. The first request carries [(GID0, NID1, LID3, CID0), (GID1, NID0, LID0, CID0), ADDR1]. GID0 is the advanced domain identifier of the first compute node, that is, an advanced domain identifier corresponding to the advanced domain to which the first compute node belongs, and GID1 is the advanced domain identifier of the second compute node, that is, an advanced domain identifier corresponding to the advanced domain to which the second compute node belongs. Optionally, the first request further carries domain indication information, and the domain indication information indicates communication between compute nodes in different advanced domains. For example, the domain indication information is [GID_valid=1, LID_valid=1], [GID_valid=1, NID_valid=1], or [GID_valid=1].

It can be learned from the foregoing descriptions that a function module includes a function engine and a port. The function engine has a resource and a routing capability, and the port has independent configuration space and is configured to forward a message of the function engine. Based on this, it is assumed that the first function module is a first function engine, and the second function module is a second function engine. In this case, an implementation process in which the first function module in the first compute node sends the first request to the second function module in the second compute node, to request to access the resource of the second function module may be as follows: The first function engine sends the first request to the second function engine through a port corresponding to the first function engine, to request to access the resource of the second function engine.

Optionally, if an intermediate domain further exists between the first-level domain and the second-level domain, ports are classified into two types. One type of port is configured to connect different compute nodes, and the other type of port is configured to connect function modules in different intermediate domains in a same compute node. Alternatively, if an intermediate domain further exists between the first-level domain and the second-level domain, and an advanced domain further exists above the first-level domain, ports are classified into three types. One type of port is configured to connect different compute nodes, another type of port is configured to connect function modules in different intermediate domains in a same compute node, and still another type of port is configured to connect compute nodes in different advanced domains. Alternatively, if an intermediate domain further exists between the first-level domain and the second-level domain, and an advanced domain further exists above the first-level domain, ports are classified into two types. One type of port is configured to connect compute nodes in different advanced domains, and the other type of port is configured to connect function modules in different intermediate domains in a same compute node. In other words, ports for interconnection are classified, to facilitate management.

It should be noted that, in this embodiment of this application, based on an idea of separating an engine from a port, a function engine and a port are decoupled into different components, and the port has independent configuration space. In other words, configuration registers of the function engine and the port are designed separately, so that both the port and the function engine can be managed. On a data plane, only a function engine may directly initiate a request, a command, or the like to perform communication, and a port is only configured to assist in data plane communication. In other words, a port is only configured to transmit the request, the command, or the like, to connect function engines in the computing system. However, on a management plane, a port can also initiate communication. For example, if a port is faulty, the port may send a fault notification to a corresponding function engine.

In this embodiment of this application, when the first function engine in the first compute node generates the first request, the first source address may carry the first-level identifier of the first compute node and the second-level identifier of the first function engine. Alternatively, when the first function engine in the first compute node generates the first request, the first source address carries the second-level identifier of the first function engine, and when the first request is about to be sent from the first compute node through a first egress port, the first egress port adds the first-level identifier of the first compute node to the first source address.

If one layer of intermediate domains exists, and when the first function module in the first compute node generates the first request, the first source address may include the first-level identifier of the first compute node, an intermediate domain identifier of a first logical module, and the second-level identifier of the first function module. The first logical module is a logical module to which the first function module belongs. Alternatively, when the first function module in the first compute node generates the first request, the first source address carries the second-level identifier of the first function module. When the first request is about to be sent from the first logical module through a second egress port, the second egress port adds the intermediate domain identifier of the first logical module to the first source address. When the first request is about to be sent from the first compute node through the first egress port, the first egress port adds the first-level identifier of the first compute node to the first source address.

If one layer of advanced domains exists and the first compute node and the second compute node belong to different advanced domains, and when the first function module in the first compute node generates the first request, the first source address may carry the advanced domain identifier of the first compute node, the first-level identifier of the first compute node, and the second-level identifier of the first function module. Alternatively, when the first function module in the first compute node generates the first request, the first source address carries the second-level identifier of the first function module. When the first request is about to be sent from the first compute node through the first egress port, the first egress port adds the first-level identifier of the first compute node to the first source address. When the first request is about to be sent from the advanced domain to which the first compute node belongs through a third egress port, the third egress port adds the advanced domain identifier of the first compute node to the first source address. Optionally, in some cases, the third egress port and the second egress port are a same port, and the second egress port is a global port. In short, when a request is about to be sent from a domain of a specific level, an identifier of the corresponding level is added to a source address through a port of a corresponding type.

Optionally, the first request may be routed to the second compute node through a fixed path, and specifically routed to the second function engine in the second compute node. Alternatively, when the first request passes through each hop, a function engine of a current hop determines a next hop. For example, the function engine of the current hop determines the next hop by using a routing table and a routing algorithm. Both a source address and a destination address in the routing table are addressed by using an advanced domain identifier (if any), a first-level identifier, an intermediate domain identifier (if any), and a second-level identifier.

Step 502: The first function module receives a first response returned by the second function module.

In this embodiment of this application, after the first function module in the first compute node sends the first request to the second function module in the second compute node, the first function module receives the first response returned by the second function module. For example, the second function module feeds back, to the first function module by using the first response, specific information of the resource that the first function module requests to access.

A structure of the first response is similar to that of the first request. For example, a source address carried in the first response includes the first-level identifier of the second compute node and the second-level identifier of the second function module, and a destination address carried in the first response includes the first-level identifier of the first compute node and the second-level identifier of the first function module. If an intermediate domain further exists, the source address carried in the first response further includes an intermediate domain identifier of a second logical module to which the second function module belongs, and the destination address carried in the first response further includes the intermediate domain identifier of the first logical module. If an advanced domain further exists, the source address carried in the first response further includes the advanced domain identifier of the second compute node, and the destination address carried in the first response further includes the advanced domain identifier of the first compute node. In addition, a routing manner of the first response is also similar to that of the first request. For example, the first response may alternatively be routed to the first compute node through a fixed path or a path determined by using a routing algorithm, and specifically routed to the first function engine in the first compute node. The first response needs to pass through at least one global port in a routing process.

It should be noted that there is a case in which the first function module may not receive the response returned by the second function module. For example, the first request is not successfully sent to the second function module, the first response fed back by the second function module is not successfully sent to the first function module, or the second function module does not need to provide a feedback.

The foregoing describes an addressing process between different compute nodes. The following still uses the first compute node as an example to describe an addressing process between different function modules in a same compute node.

In this embodiment of this application, for a third function module and a fourth function module in the first compute node, the third function module sends a second request to the fourth function module, to request to access a resource of the fourth function module. The third function module receives a second response returned by the fourth function module. The second request carries a second source address, a second destination address, and an address of a resource that the third function module requests to access. The second source address includes a second-level identifier of the third function module, and the second destination address includes a second-level identifier of the fourth function module.

For example, a third function module of CPU0 in the first compute node initiates access to a register address ARRD0 managed by a fourth function module of a network interface card. Both the second request and the second response belong to a same compute node, but belong to different second-level domains. The second request carries [(CID1), (CID0), ADDR0]. (CID1) represents the second source address, and CID1 is a second-level identifier of the third function module of CPU0. (CID0) represents the second destination address, and CID0 is a second-level identifier of the fourth function module of the network interface card. Optionally, the second request further carries one piece of domain indication information, and the domain indication information indicates communication between different function modules in a same compute node. For example, the domain indication information is [GID_valid=0, NID_valid=0, CID_valid=1] or [NID_valid=0, CID_valid=1].

Optionally, the second source address further includes the first-level identifier and/or the advanced domain identifier of the first compute node, and the second destination address further includes the first-level identifier and/or the advanced domain identifier of the first compute node.

Optionally, it can be learned from the foregoing descriptions that one or more layers of intermediate domains are further included between a first-level domain corresponding to a compute node and a second-level domain corresponding to a function module, and function modules in different intermediate domains at a same layer have different intermediate domain identifiers. In this case, if the third function module and the fourth function module belong to different intermediate domains, the second source address further includes an intermediate domain identifier of the third function module, and the second destination address further includes an intermediate domain identifier of the fourth function module.

For example, one layer of intermediate domains is further included between the first-level domain and the second-level domain. It is assumed that one intermediate domain includes one logical module. The third function module of CPU0 in the first compute node initiates the access to the register address ARRD0 managed by the fourth function module of the network interface card. CPU0 and the network interface card belong to different logical modules. In other words, the second request and the second response belong to a same compute node, but belong to different intermediate domains. The second request carries [(LID1, CID2), (LID0, CID1), ADDR0]. (LID1, CID2) represents the second source address. LID1 is an intermediate domain identifier of CPU0, and CID2 is the second-level identifier of the third function module. (LID0, CID1) represents the second destination address. LID0 is an intermediate domain identifier of the network interface card, and CID1 is the second-level identifier of the fourth function module. Optionally, the second request further carries one piece of domain indication information, and the domain indication information indicates communication between different logical modules in a same compute node. For example, the domain indication information is [GID_valid=0, NID_valid=0, LID_valid=1] or [NID_valid=0, LID_valid=1].

It can be learned from the foregoing descriptions that a function module includes a function engine and a port. The function engine has a resource and a routing capability, and the port has independent configuration space and is configured to forward a message of the function engine. Based on this, it is assumed that the third function module is a third function engine, and the fourth function module is a fourth function engine. In this case, an implementation process in which the third function module sends the second request to the fourth function module, to request to access the resource of the fourth function module may be as follows: The third function engine sends the second request to the fourth function engine through a port corresponding to the third function engine, to request to access the resource of the fourth function engine.

In this embodiment of this application, when the third function module in the first compute node generates the second request, the second source address includes the second-level identifier of the third function module. If one layer of intermediate domains exists, and the third function module and the fourth function module belong to different intermediate domains, and when the third function module in the first compute node generates the second request, the second source address carries an intermediate domain identifier of a third logical module to which the third function module belongs and the second-level identifier of the third function module. Alternatively, when the third function module in the first compute node generates the second request, the second source address carries the second-level identifier of the third function module, and when the second request is about to be sent from the third logical module through an egress port, the egress port adds the intermediate domain identifier of the third logical module to the second source address. Optionally, the egress port is a local port.

Optionally, the second request may be routed to the fourth function module through a fixed path. Alternatively, when the second request passes through each hop, a function module of a current hop determines a next hop. For example, the function module of the current hop determines the next hop by using a routing table and a routing algorithm. Optionally, both a source address and a destination address in the routing table are addressed by using an intermediate domain identifier and a second-level identifier, or addressed by using an advanced domain identifier, a first-level identifier, an intermediate domain identifier, and a second-level identifier.

In this embodiment of this application, after the third function module in the first compute node sends the second request to the fourth function module, the third function module receives the second response returned by the fourth function module. For example, the fourth function module feeds back, to the third function module by using the second response, specific information of a resource requested by the third function module.

A structure of the second response is similar to that of the second request. For example, a source address carried in the second response includes the second-level identifier of the fourth function module, and a destination address carried in the second response includes the second-level identifier of the third function module. If an intermediate domain further exists, and the third function module and the fourth function module belong to different intermediate domains, the source address carried in the second response further includes an intermediate domain identifier of the fourth logical module, and the destination address carried in the second response further includes the intermediate domain identifier of the third logical module. In addition, a routing manner of the second response is also similar to that of the second request. For example, the second response may alternatively be routed to the third function module through a fixed path or a path determined by using a routing algorithm. If the third function module and the fourth function module belong to different intermediate domains, the second response needs to pass through at least one local port in a routing process.

It should be noted that there is a case in which the third function module may not receive the response returned by the fourth function module. For example, the second request is not successfully sent to the fourth function module, the second response fed back by the fourth function module is not successfully sent to the third function module, or the fourth function module does not need to provide a feedback.

It should be noted that the first function module and the third function module may be a same function module or different function modules in the first compute node. In other words, the words "first". "second". "third", and the like in the foregoing embodiments are merely used as examples for introduction, and are not used to limit a specific object.

It can be learned from the foregoing descriptions that the computing system in this embodiment of this application includes domains at a plurality of levels, for example, includes a first-level domain (that is, a node domain) and a second-level domain (that is, a component domain), One node domain includes one compute node, and one second-level domain includes one function module (that is, a function engine or a port), Optionally, the computing system further includes one or more layers of intermediate domains (that is, logical domains or local domains), If the computing system includes one layer of intermediate domains, one intermediate domain includes one logical module. Optionally, the computing system further includes one or more layers of advanced domains, and one advanced domain includes one or more compute nodes. If the computing system includes one layer of advanced domains, the advanced domain may be referred to as a global domain.

It can be learned from the foregoing descriptions that, if the computing system further includes one layer of intermediate domains (that is, the logical domain) and one layer of advanced domains (that is, the global domain), it is assumed that one intermediate domain corresponds to one logical module, and different logical modules in a same compute node have different intermediate domain identifiers. In this case, different logical modules in a same advanced domain may have a same intermediate domain identifier, and the different logical modules in the same advanced domain need to be distinguished by using a first-level identifier and an intermediate domain identifier. However, if the different logical modules in the same advanced domain have different logical domain identifiers, intermediate domain identifiers of the logical module may be directly used to distinguish the different logical modules in the same advanced domain, so that a first-level identifier of a compute node may be omitted during addressing. In short, in this embodiment of this application, the computing system may alternatively be divided into domains at three levels. A domain at a $1^{st}$ level is a global domain, a domain at a $2^{nd}$ level is a logical domain, and a domain at a $3^{rd}$ level is a component domain. However, different logical modules in a same global domain need to have different intermediate domain identifiers. The following describes the addressing method provided in this embodiment of this application again by using an example in which the computing system is divided into domains at the three levels. In the following embodiment, the first compute node is still used as an example for description, and it is assumed that an advanced domain identifier (that is, a global identifier) is a GID, an intermediate domain identifier (that is, a logical identifier) is an LID, and a second-level identifier (that is, a component identifier) is a CID.

First, an addressing process between compute nodes in different global domains is introduced. In this embodiment of this application, a first function engine of a first logical module in the first compute node sends the first request to a second function engine of a second logical module in the second compute node, to request to access the resource of the second function engine. The first request carries a first source address, a first destination address, and an address of the resource that is of the second function engine and that is requested to be accessed. The first source address includes a GID of the first compute node, an LID of the first logical module, and a CID of the first function engine. The first destination address includes a GID of the second compute node, an LID of the second logical module, and a CID of the second function engine. Optionally, the first request further carries domain indication information, and the domain indication information indicates communication between compute nodes in different global domains.

Figure 6:
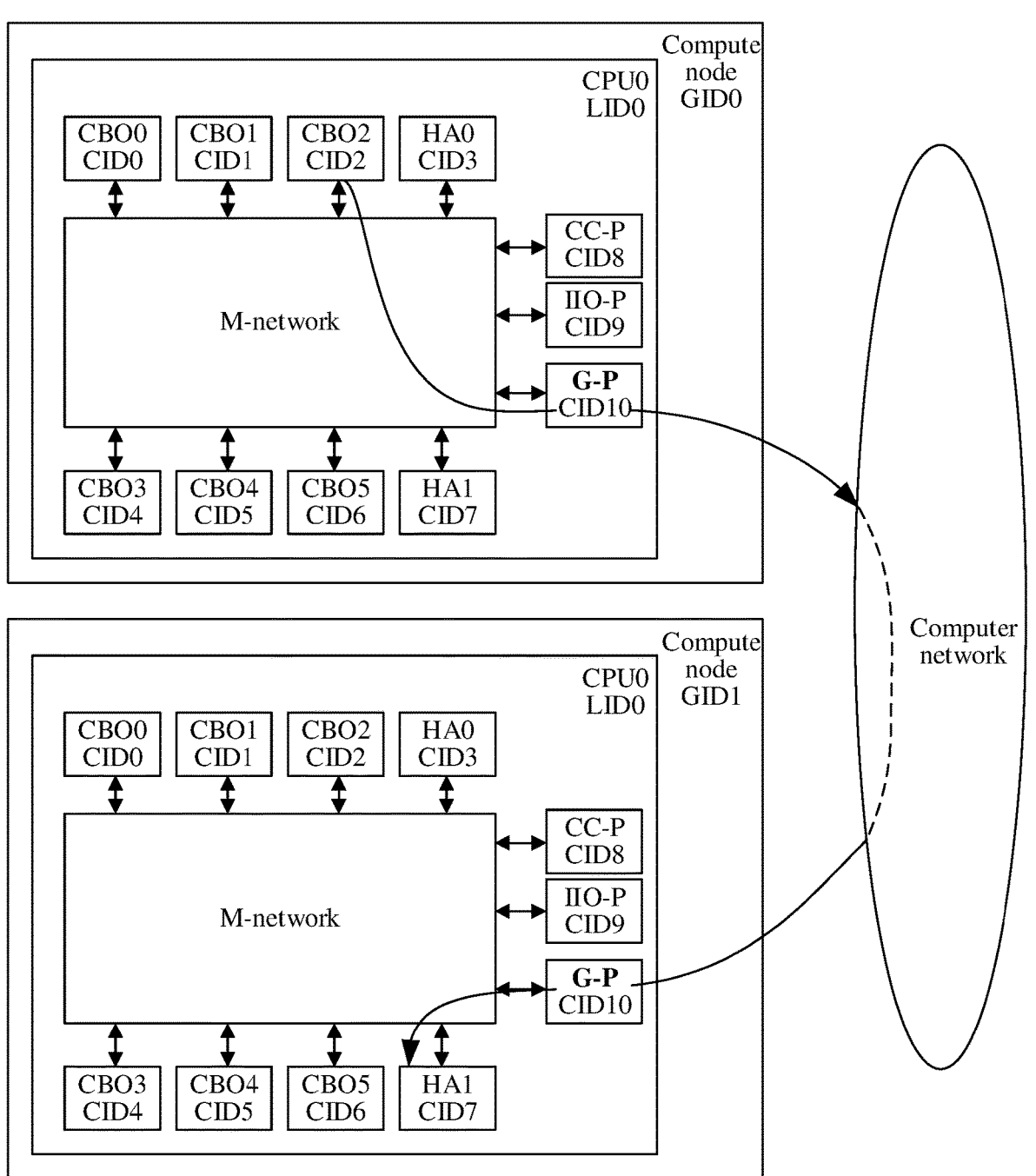
FIG. 6 is a schematic diagram of communication between compute nodes in different global domains according to an embodiment of this application.

FIG. 6 is a schematic diagram of communication between compute nodes in different global domains according to an embodiment of this application. Refer to FIG. 6, CBO2 inside CPU0 of a compute node in a global domain GD0 initiates access to a memory address ADDR0 managed by HA1 inside CPU0 of a compute node in GD2. CBO2 sends a request (or command) to HA1. A source address (denoted as a source ID) carried in the request includes GID0, LID0, and CID2, a destination address (denoted as a destination ID) includes GID1, LID0, and CID7, and a requested memory address (denoted as a resource) is ADDR0. Optionally, the request further carries one piece of domain indication information [GID_valid=1, LID_valid=1] or [GID_valid=1], indicating communication between different global domains. In a process in which the request performs routing, the request is first sent to an egress port inside CPU0 through a mesh network (M-network for short in the figure) inside CPU0 to which CBO2 belongs. The egress port is a global port, that is, a port of a G-P type. A point-to-point communication connection is established between the egress port and an ingress port of CPU0 in GD1 through a computer network. The ingress port is also a global port, that is, a port of a G-P type. The request is sent to HA1 inside CPU0 in GD1 through the ingress port. In addition, both a CC port (CC port, CC-P) and an IIO port (IIO port, IIO-P) shown in FIG. 6 are local ports, that is, ports of an L-P type.

Figure 7:
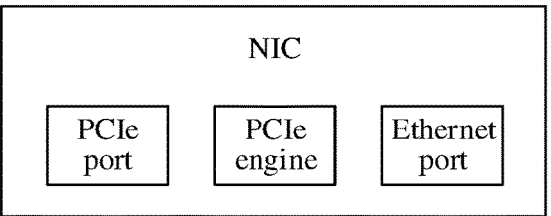
FIG. 7 is a schematic diagram of a network interface card in a related technology according to an embodiment of this application.

Assuming that the egress port and the ingress port described in FIG. 6 are ports in a network interface card (network interface card, NIC), the network interface card in this solution only needs to have a component such as a port, and does not need a function engine. FIG. 7 is a schematic diagram of a network interface card in a related technology according to an embodiment of this application. In the related technology, the network interface card needs to have a port (for example, including a PCIe port and an Ethernet port) and a function engine (for example, including a PCIe engine), to perform protocol conversion and the like by using the function engine. It can be learned that, compared with a network interface card solution in the related technology, this solution can reduce components such as a function engine, to further reduce a network software stack.

Second, an addressing process between different logical modules in a same global domain is introduced. In this embodiment of this application, for a third logical module and a fourth logical module that belong to a same global domain, a third function engine in the third logical module sends a second request to a fourth function engine in the fourth logical module, to request to access a resource of the fourth function engine. The second request carries a second source address, a second destination address, and an address of a resource that is of the fourth function engine and that is requested to be accessed. The second source address includes an LID of the third logical module and a CID of the third function engine, and the second destination address includes an LID of the fourth logical module and a CID of the fourth function engine. Optionally, the second source address and the second destination address further include a GID of the global domain. Optionally, the second request further carries one piece of domain indication information, and the domain indication information indicates communication between different logical modules in a same global domain.

Figure 8:
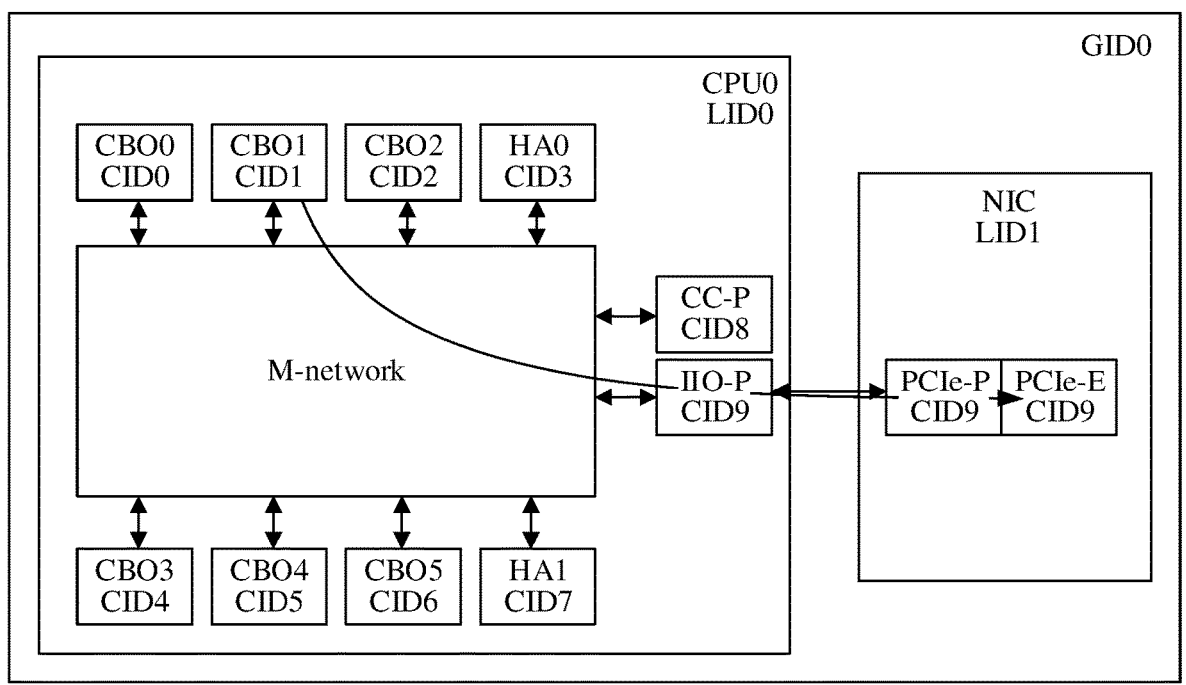
FIG. 8 is a schematic diagram of communication between different logical modules in a same global domain according to an embodiment of this application.

FIG. 8 is a schematic diagram of communication between different logical modules in a same global domain according to an embodiment of this application. Refer to FIG. 8. CPU0 and a network interface card (NIC) belong to a same global domain, but belong to different logical domains. CBO1 inside CPU0 initiates access to a register address ADDR0 of the network interface card. CBO1 sends a request to a PCIe engine of the network interface card. A source address carried in the request includes LID0 and CID1, a destination address includes LID1 and CID1, and a requested register address is ADDR0. Optionally, the request further carries one piece of domain indication information, and the domain indication information is [GID_valid=0, LID_valid=1], indicating the communication between the different logical modules in the same global domain. In a process in which the request performs routing, the request is first sent to an egress port inside CPU0 through a mesh network inside CPU0 to which CBO1 belongs. The egress port is a local port, that is, a port of an L-P type, and the egress port is an IIO port. A point-to-point communication connection is established between the egress port and an ingress port inside the network interface card. The ingress port is also a local port, and the ingress port is a PCIe port (PCIe port. PCIE-P), The request is sent to the PCIe engine (PCIe engine. PCIE-E) of the network interface card through the ingress port.

Figure 9:
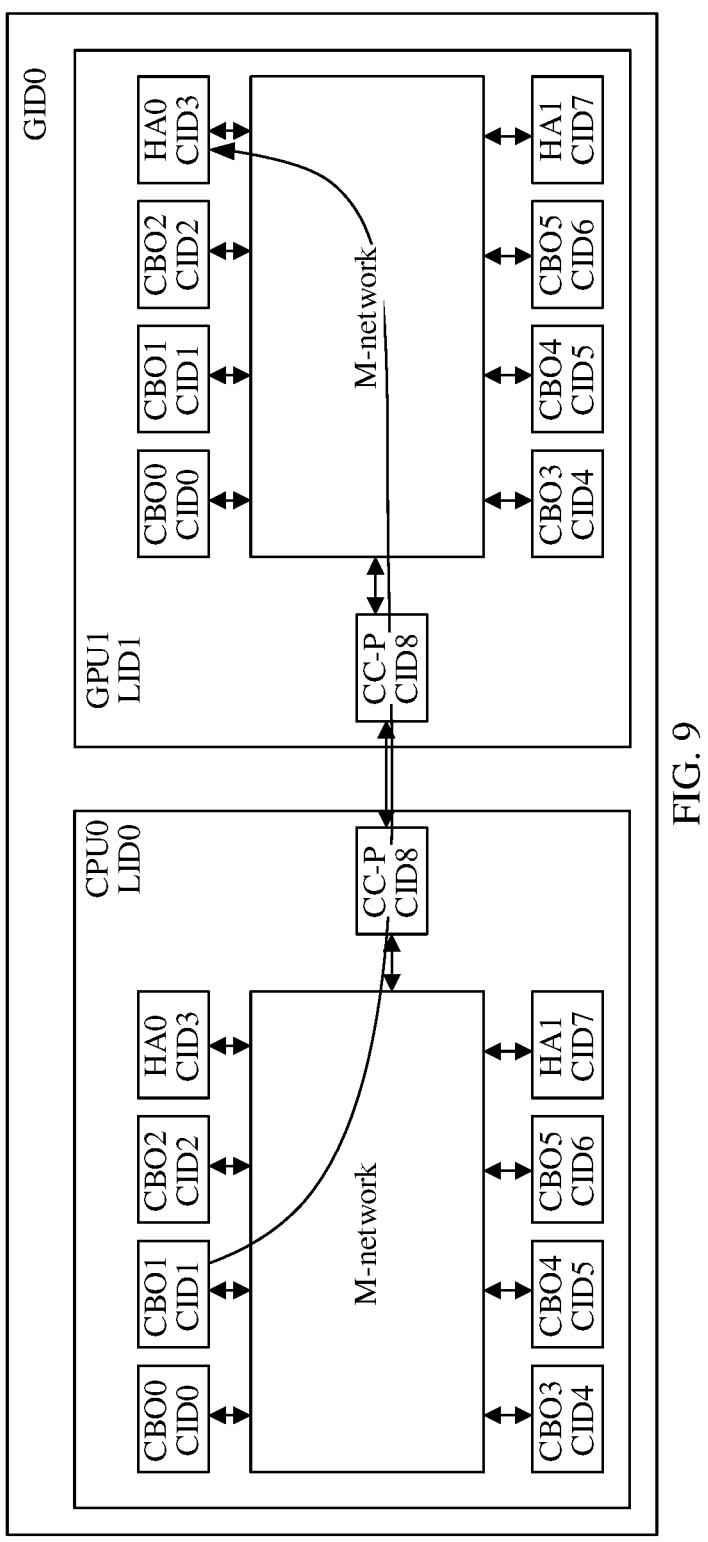
FIG. 9 is another schematic diagram of communication between different logical modules in a same global domain according to an embodiment of this application.

FIG. 9 is another schematic diagram of communication between different logical modules in a same global domain according to an embodiment of this application. Refer to FIG. 9. CPU0 and GPU1 belong to a same global domain, but belong to different logical domains. CBO0 inside CPU0 initiates access to a memory address ADDR0 managed by HA0 inside GPU1. CBO0 sends a request to HA0 inside GPU1. A source address carried in the request includes LID0 and CID0, a destination address includes LID1 and CID3, and a requested register address is ADDR0. Optionally, the request further carries one piece of domain indication information, and the domain indication information is [GID_valid=0), LID_valid=1], indicating the communication between the different logical modules in the same global domain. In a process in which the request performs routing, the request is first sent to an egress port inside CPU0 through a mesh network inside CPU0 to which CBO0 belongs. The egress port is a local port, that is, a port of an L-P type, and the egress port is a CC port. A point-to-point communication connection is established between the egress port and an ingress port inside GPU1. The ingress port is also a local port, and the ingress port is a CC port. The request is sent to HA0 inside GPU1 through the ingress port.

Then, an addressing process between different function engines in a same logic module is introduced. In this embodiment of this application, for a fifth function engine and a sixth function engine that belong to a same logical module, the fifth function engine sends a third request to the sixth function engine, to request to access a resource of the sixth function engine. The third request carries a third source address, a third destination address, and an address of a resource that is of the sixth function engine and that is requested to be accessed. The third source address includes a CID of the fifth function engine, and the third destination address includes a CID of the sixth function engine. Optionally, both the third source address and the third destination address further include an LID of the sixth logical module and a GID of a global domain to which the sixth logical module belongs. Optionally, the request further carries domain indication information, and the domain indication information indicates communication between different function engines in a same logical module.

Figure 10:
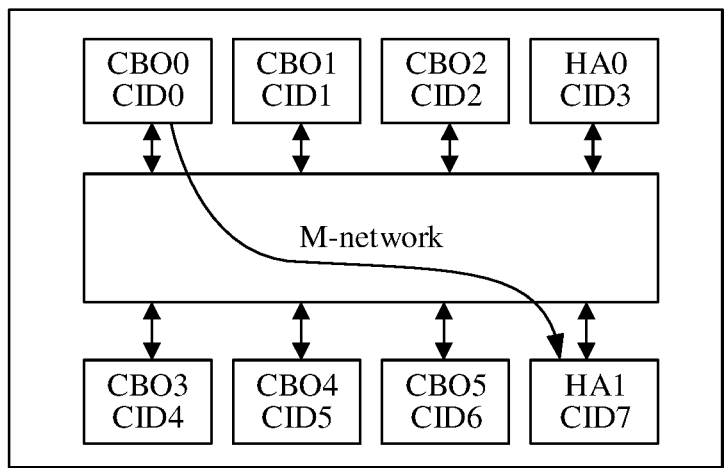
FIG. 10 is a schematic diagram of communication between different function engines in a same logical module according to an embodiment of this application.

FIG. 10 is a schematic diagram of communication between different function engines in a same logical module according to an embodiment of this application. In FIG. 10, function engines such as CBO0, CBO1, HA0, and HA1 belong to a same logical module, and the logical module may be one CPU. In FIG. 10. CBO0 initiates access to a memory address ADDR0 managed by HA1, in other words. CBO0 sends a request to HA1. A source address carried in the request includes CID0, a destination address includes CID7, and a memory address that is requested to be accessed is ADDR0. Optionally, the request further carries one piece of domain indication information, and the domain indication information is [GID_valid=0, LID_valid=0] or [LID_valid=0], indicating communication between different function engines in a same logical module. In a process in which the request performs routing, the request is sent to HA1 through a mesh network in which CBO0 is located. In other words, in this embodiment of this application, different function engines in a same logical module have a communication capability. This solution does not limit a management and control manner of an internal port of a channel between internal function engines of the logical module.

It can be learned from the foregoing descriptions that embodiments of this application actually provide a next-generation cluster native computing (cluster native computing. CNC) architecture, that is, a next-generation computing architecture based on a new interconnection architecture. In this solution, a function module (that is, a component, such as a function engine and a port) may be used as a basic configurable unit. A set of ID allocation manners and principles are followed both in compute nodes and between compute nodes. Access between compute nodes and in compute nodes follows a unified ID routing manner. This simplifies the software driver and management plane. According to this solution, latency of a data processing procedure can be effectively reduced, and congestion in communication can be reduced.

In conclusion, in embodiments of this application, each compute node in a computing system has a different first-level identifier, and a plurality of function modules in each compute node have different second-level identifiers. The second-level identifier is used for routing and addressing between function modules in a same compute node, and the first-level identifier and the second-level identifier are used for routing and addressing between function modules in different compute nodes. In other words, unified addressing is performed on different compute nodes, and is also performed on function modules in a same compute node. In this way, interconnection specifications used during communication between compute nodes and communication in compute nodes are consistent, complex protocol conversion is not needed, data processing efficiency is improved, and latency is reduced. In addition, the unified addressing enables bus design to be simple and reduces heaviness of the software stack.

Embodiments of this application provide a compute node. The compute node may be implemented as a part or all of a computer device by using software, hardware, or a combination thereof. The computer device may be the compute node in the embodiments in FIG. 1 to FIG. 10. A first compute node is used as an example. The first compute node is a compute node in a computing system. The computing system includes a plurality of compute nodes, each compute node has a different first-level identifier, and a plurality of function modules in each compute node have different second-level identifiers.

A first function module in the first compute node is configured to send a first request to a second function module in a second compute node, to request to access a resource of the second function module.

The first function module is further configured to receive a first response returned by the second function module.

The first request carries a first source address, a first destination address, and an address of the resource that the first function module requests to access. The first source address includes a first-level identifier of the first compute node and a second-level identifier of the first function module, and the first destination address includes a first-level identifier of the second compute node and a second-level identifier of the second function module.

Optionally, one or more layers of intermediate domains are further included between a first-level domain corresponding to the compute node and a second-level domain corresponding to the function module, and function modules in different intermediate domains at a same layer have different intermediate domain identifiers. The first source address further includes an intermediate domain identifier of the first function module, and the first destination address further includes an intermediate domain identifier of the second function module.

Optionally, the computing system includes one or more layers of advanced domains, and compute nodes in different advanced domains at a same layer have different advanced domain identifiers. If the first compute node and the second compute node belong to different advanced domains, the first source address further includes an advanced domain identifier of the first compute node, and the first destination address further includes an advanced domain identifier of the second compute node.

Optionally, the function module includes a function engine and a port. The function engine has a resource and a routing capability, and the port has independent configuration space and is configured to forward a message of the function engine. The first function module is a first function engine, and the second function module is a second function engine.

The first function engine is configured to send the first request to the second function engine through a port corresponding to the first function engine, to request to access a resource of the second function engine.

Optionally, for a third function module and a fourth function module in the first compute node, the third function module is configured to send a second request to the fourth function module, to request to access a resource of the fourth function module.

The third function module is further configured to receive a second response returned by the fourth function module.

The second request carries a second source address, a second destination address, and an address of a resource that the third function module requests to access. The second source address includes a second-level identifier of the third function module, and the second destination address includes a second-level identifier of the fourth function module.

Optionally, one or more layers of intermediate domains are further included between the first-level domain corresponding to the compute node and the second-level domain corresponding to the function module, and the function modules in the different intermediate domains at the same layer have different intermediate domain identifiers. If the third function module and the fourth function module belong to different intermediate domains, the second source address further includes an intermediate domain identifier of the third function module, and the second destination address further includes an intermediate domain identifier of the fourth function module.

Optionally, the function module includes a function engine and a port. The function engine has a resource and a routing capability, and the port has independent configuration space and is configured to forward a message of the function engine. The third function module is a third function engine, and the fourth function module is a fourth function engine.

The third function engine is configured to: if the third function engine and the fourth function engine belong to different intermediate domains, send the second request to the fourth function engine through a port corresponding to the third function engine, to request to access a resource of the fourth function engine.

Optionally, the resource includes at least one of a computing resource, a storage resource, and a network resource.

In this embodiment of this application, unified addressing is performed on different compute nodes, and is also performed on function modules in a same compute node. In this way, interconnection specifications used during communication between compute nodes and communication in compute nodes are consistent, complex protocol conversion is not needed, data processing efficiency is improved, and latency is reduced. In addition, the unified addressing enables bus design to be simple and reduces heaviness of the software stack.

It should be noted that, when the compute node provided in the foregoing embodiments performs addressing, division of the foregoing function modules is merely used as an example for description. In actual application, the foregoing functions may be allocated to different function modules for implementation according to a requirement. In other words, an internal structure of the apparatus is divided into different function modules to implement all or some of the functions described above. In addition, the compute node provided in the foregoing embodiment and the addressing method embodiments belong to a same concept. For a specific implementation process of the compute node, refer to the method embodiments. Details are not described herein again.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, the procedures or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid state disk (SSD)), or the like. It should be noted that, the computer-readable storage medium mentioned in embodiments of this application may be a non-volatile storage medium, or in other words, may be a non-transitory storage medium.

It should be understood that "at least one" mentioned in this specification means one or more and "a plurality of" means two or more. In the descriptions of embodiments of this application. "/" means "or" unless otherwise specified. For example, A/B may represent A or B. In this specification, "and/or" describes only an association relationship between associated objects and represents that three relationships may exist. For example, A and/or B may represent the following three cases: Only A exists, both A and B exist, and only B exists. In addition, to clearly describe the technical solutions in embodiments of this application, terms such as "first" and "second" are used in embodiments of this application to distinguish between same items or similar items that have basically same functions and purposes. A person skilled in the art may understand that the terms such as "first" and "second" do not limit a quantity and an execution sequence, and the terms such as "first" and "second" do not indicate a definite difference.

It should be noted that, information (including but not limited to user equipment information and user personal information), data (including but not limited to data used for analysis, stored data, and displayed data), and signals involved in embodiments of this application are authorized by the user or fully authorized by all parties, and collection, use, and processing of related data need to comply with related laws, regulations, and standards of related countries and regions.

The foregoing descriptions are merely embodiments of this application, but are not intended to limit this application. Any modification, equivalent replacement, or improvement made without departing from the spirit and principle of this application should fall within the protection scope of this application.

What is claimed is:

1. A computing system, wherein the computing system comprises a plurality of compute nodes, each compute node has a different first-level identifier, and a plurality of function modules in each compute node have different second-level identifiers; and each second-level identifier is used for routing and addressing between the plurality of function modules in a same compute node, and the first-level identifier and the second-level identifier are used for routing and addressing between function modules in different compute nodes, wherein one or more layers of at least one intermediate domains are further comprised between a first-level domain corresponding to the compute node and a second-level domain corresponding to the function module, function modules in different intermediate domains at a same layer have different intermediate domain identifiers, and the intermediate domain identifier is used for routing and addressing between the function modules in the different intermediate domains.

2. The computing system according to claim 1, wherein a same addressing rule is used for a mode of the routing and addressing between the plurality of function modules in the same compute node and for a mode of the routing and addressing between the function modules in the different compute nodes; and a same communication protocol is used for the routing and addressing between the plurality of function modules in the same compute node and for the routing and addressing between the function modules in the different compute nodes.

3. The computing system according to claim 1, wherein second-level identifiers of the function modules in the different intermediate domains are one of the same or different.

4. The computing system according to claim 1, wherein the computing system comprises one or more layers of advanced domains, compute nodes in different advanced domains at a same layer have different advanced domain identifiers, and the advanced domain identifier is used for routing and addressing between the compute nodes in the different advanced domains.

5. The computing system according to claim 1, wherein the function module comprises a function engine and a port, the function engine has a resource and a routing capability, and the port has independent configuration space and is configured to forward a message of the function engine.

6. The computing system according to claim 5, wherein the resource comprises at least one of a computing resource, a storage resource, or a network resource.

7. An addressing method, applied to a computing system, wherein the computing system comprises a plurality of compute nodes, each compute node has a different first-level identifier, and a plurality of function modules in each compute node have different second-level identifiers; and the method comprises:

sending, by a first function module in a first compute node, a first request to a second function module in a second compute node, to request to access a resource of the second function module; and receiving, by the first function module, a first response returned by the second function module, wherein the first request carries a first source address, a first destination address, and an address of the resource that the first function module requests to access, the first source address comprises a first-level identifier of the first compute node and a second-level identifier of the first function module, and the first destination address comprises a first-level identifier of the second compute node and a second-level identifier of the second function module.

8. The method according to claim 7, wherein one or more layers of intermediate domains are further comprised between a first-level domain corresponding to the compute node and a second-level domain corresponding to the function module, and function modules in different intermediate domains at a same layer have different intermediate domain identifiers; and the first source address further comprises an intermediate domain identifier of the first function module, and the first destination address further comprises an intermediate domain identifier of the second function module.

9. The method according to claim 7, wherein the computing system comprises one or more layers of advanced domains, and compute nodes in different advanced domains at a same layer have different advanced domain identifiers; and when it is determined that the first compute node and the second compute node belong to different advanced domains, the first source address further comprises an advanced domain identifier of the first compute node, and the first destination address further comprises an advanced domain identifier of the second compute node.

10. The method according to claim 7, wherein the function module comprises a function engine and a port, the function engine has a resource and a routing capability, the port has independent configuration space and is configured to forward a message of the function engine, the first function module is a first function engine, and the second function module is a second function engine; and the sending, by a first function module in a first compute node, a first request to a second function module in a second compute node, to request to access a resource of the second function module comprises:

sending, by the first function engine, the first request to the second function engine through a port corresponding to the first function engine, to request to access the resource of the second function engine.

11. The method according to claim 7, wherein the method further comprises:

sending, by a third function module, a second request to a fourth function module, to request to access a resource of the fourth function module; and receiving, by the third function module, a second response returned by the fourth function module, wherein the second request carries a second source address, a second destination address, and an address of the resource that the third function module requests to access, the second source address comprises a second-level identifier of the third function module, and the second destination address comprises a second-level identifier of the fourth function module.

12. The method according to claim 11, wherein the one or more layers of intermediate domains are further comprised between the first-level domain corresponding to the compute node and the second-level domain corresponding to the function module, and the function modules in the different intermediate domains at the same layer have the different intermediate domain identifiers; and when it is determined the third function module and the fourth function module belong to different intermediate domains, the second source address further comprises an intermediate domain identifier of the third function module, and the second destination address further comprises an intermediate domain identifier of the fourth function module.

13. The method according to claim 11, wherein the function module comprises a function engine and a port, the function engine has a resource and a routing capability, the port has independent configuration space and is configured to forward a message of the function engine, the third function module is a third function engine, and the fourth function module is a fourth function engine; and the sending, by the third function module, a second request to the fourth function module, to request to access a resource of the fourth function module comprises:

when it is determined the third function engine and the fourth function engine belong to different intermediate domains, sending, by the third function engine, the second request to the fourth function engine through a port corresponding to the third function engine, to request to access the resource of the fourth function engine.

14. The method according to claim 7, wherein the resource comprises at least one of a computing resource, a storage resource, or a network resource.

15. A first compute node, wherein a computing system comprises a plurality of compute nodes, each compute node has a different first-level identifier, and a plurality of function modules in each compute node have different second-level identifiers;

a first function module in the first compute node is configured to send a first request to a second function module in a second compute node, to request to access a resource of the second function module; and the first function module is further configured to receive a first response returned by the second function module, wherein the first request carries a first source address, a first destination address, and an address of the resource that the first compute node requests to access, the first source address comprises a first-level identifier of the first compute node and a second-level identifier of the first function module, and the first destination address comprises a first-level identifier of the second compute node and a second-level identifier of the second function module.

16. The first compute node according to claim 15, wherein one or more layers of intermediate domains are further comprised between a first-level domain corresponding to the compute node and a second-level domain corresponding to the function module, and function modules in different intermediate domains at a same layer have different intermediate domain identifiers; and the first source address further comprises an intermediate domain identifier of the first function module, and the first destination address further comprises an intermediate domain identifier of the second function module.

17. The first compute node according to claim 15, wherein the computing system comprises one or more layers of advanced domains, and compute nodes in different advanced domains at a same layer have different advanced domain identifiers; and when it is determined the first compute node and the second compute node belong to different advanced domains, the first source address further comprises an advanced domain identifier of the first compute node, and the first destination address further comprises an advanced domain identifier of the second compute node.

18. The first compute node according to claim 15, wherein the function module comprises a function engine and a port, the function engine has a resource and a routing capability, the port has independent configuration space and is configured to forward a message of the function engine, the first function module is a first function engine, and the second function module is a second function engine; and the first function engine is configured to send the first request to the second function engine through a port corresponding to the first function engine, to request to access a resource of the second function engine.

\* \* \* \* \*